United States Patent
Benton et al.

(10) Patent No.: US 11,719,563 B2
(45) Date of Patent: Aug. 8, 2023

(54) DISTRIBUTED ANOMALY DETECTION USING COMBINABLE MEASUREMENT VALUE SUMMARIES

(71) Applicant: Red Hat, Inc., Raleigh, NC (US)

(72) Inventors: William C. Benton, Madison, WI (US); Sophie Watson, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 940 days.

(21) Appl. No.: 16/502,604

(22) Filed: Jul. 3, 2019

(65) Prior Publication Data

US 2021/0003426 A1 Jan. 7, 2021

(51) Int. Cl.
*G08B 21/18* (2006.01)
*G01D 21/00* (2006.01)
*G01D 9/00* (2006.01)

(52) U.S. Cl.
CPC ............. *G01D 21/00* (2013.01); *G01D 9/005* (2013.01); *G08B 21/18* (2013.01)

(58) Field of Classification Search
CPC .......... G01D 9/005; G01D 3/08; G01D 21/00; G08B 21/18; H04L 67/1097; H04L 67/12
See application file for complete search history.

(56) References Cited

U.S. PATENT DOCUMENTS

| | | | |
|---|---|---|---|
| 9,038,180 | B2 | 5/2015 | Neil |
| 2017/0103103 | A1* | 4/2017 | Nixon ................. G06F 16/2471 |
| 2019/0370677 | A1* | 12/2019 | Garvey ..................... G06N 7/01 |
| 2020/0074275 | A1* | 3/2020 | Xia ........................ G06N 3/0454 |
| 2020/0089874 | A1* | 3/2020 | Abbaszadeh ....... H04L 63/1433 |
| 2020/0125601 | A1* | 4/2020 | Garvey ............... G06F 16/9038 |
| 2020/0250193 | A1* | 8/2020 | Pham ..................... G06F 16/283 |
| 2020/0364607 | A1* | 11/2020 | BahenaTapia ......... G06N 20/00 |

OTHER PUBLICATIONS

Rajasegarar et al. "Distributed Anomaly Detection in Wireless Sensor Networks", pp. 1-5 (Year: 2006).*
Bezdek et al. "Centered Hyperspherical and Hyperellipsoidal One-Class Support Vector Machines for Anomaly Detection in Sensor Networks", pp. 518-532 (Year: 2010).*
Butler, Brandon, "Edge computing is a way to streamline the flow of traffic from IoT devices and provide real-time local data analysis," Network World, Sep. 21, 2017, IDG Communications, Inc., 6 pages.
Choudhary, Pramit, "Introduction to Anomaly Detection," Learn Data Science, Python, Machine Learning, Feb. 15, 2017, Oracle, 17 pages.

(Continued)

*Primary Examiner* — Eyob Hagos
(74) *Attorney, Agent, or Firm* — Dority & Manning, P.A.

(57) ABSTRACT

Distributed anomaly detection using combinable measurement value summaries is disclosed. A computing device obtains a global combined measurement value summary. The global combined measurement value summary includes a combined measurement value summary of a plurality of measurement values taken by a plurality of other computing devices measuring a first type of item. The computing device obtains a measurement value of an item of the first type. It is determined whether the new measurement value is an anomalous measurement value based at least partially on the global combined measurement value summary.

14 Claims, 18 Drawing Sheets

(56) References Cited

OTHER PUBLICATIONS

O'Reilly, Colin, et al., "Anomaly Detection in Wireless Sensor Networks in a Non-Stationary Environment," IEEE Communications Surveys & Tutorials, vol. 16, Issue 3, 2014, IEEE, pp. 1413-1432.

Rajasegarar, Sutharshan, et al., "Distributed Anomaly Detection in Wireless Sensor Networks," Singapore International Conference on Communication Systems, 2006, IEEE, 5 pages.

\* cited by examiner

DISTRIBUTED ANOMALY DETECTION USING COMBINABLE MEASUREMENT VALUE SUMMARIES

BACKGROUND

To determine whether a measurement of an attribute of some item, such as a response time of a database, or a concentration of a chemical in a body of water, or an amount of vibration generated by a piece of machinery, is a statistical outlier and therefore warranting of attention, it is necessary to know historical measurements of the attribute. It may also be helpful to know the measurements of identical attributes of the same type of item that are being measured, or have been measured, in a substantially similar environment by other measuring devices.

SUMMARY

The examples implement distributed anomaly detection using combinable measurement value summaries. The examples facilitate a very efficient mechanism for maintaining a history of measurements of an item being measured by a measurement device, and for obtaining combined histories of measurements of the same item, or a same type of item, generated by other measurement devices.

In one example a method is provided. The method includes obtaining, by a computing device over a first period of time, a first plurality of measurement values of a first item being measured. The method further includes generating, over the first period of time by the computing device based on the first plurality of measurement values, a first local measurement value summary of the measurement values, the first local measurement value summary having a bounded physical size and being configured to maintain a summarization of the first plurality of measurement values. The method further includes sending the first local measurement value summary to a central computing device. The method further includes receiving, by the computing device from the central computing device, a global combined measurement value summary, the global combined measurement value summary including the first local measurement value summary and one or more other local measurement value summaries. The method further includes obtaining, by the computing device, a new measurement value of the first item and determining whether the new measurement value is an anomalous measurement value based at least partially on the global combined measurement value summary.

In another example a second method is provided. The method includes obtaining, by a computing device, a global combined measurement value summary, the global combined measurement value summary including a combined measurement value summary of a plurality of measurement values taken by a plurality of other computing devices measuring a first type of item. The method further includes obtaining, by the computing device, a measurement value of an item of the first type. The method further includes determining whether the measurement value is an anomalous measurement value based at least partially on the global combined measurement value summary. The method further includes, in response to determining that the measurement value is an anomalous measurement value, communicating an alert.

In another example a system is provided. The system includes a first computing device including a first memory, and a first processor device coupled to the first memory. The first processor device is to obtain, over a first period of time, a first plurality of first item measurement values of a first item being measured. The first processor device is further to generate, over the first period of time based on the first plurality of first item measurement values, a first local measurement value summary of the first plurality of first item measurement values, the first local measurement value summary configured to maintain a summarization of the first plurality of first item measurement values. The first processor device is further to send the first local measurement value summary to a central computing device. The first processor device is further to receive, from the central computing device, a global combined measurement value summary, the global combined measurement value summary comprising the first local measurement value summary and a second local measurement value summary generated by a second computing device. The first processor device is further to obtain a new first item measurement value of the first item. The first processor device is further to determine whether the new first item measurement value is an anomalous measurement value based at least partially on the global combined measurement value summary.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
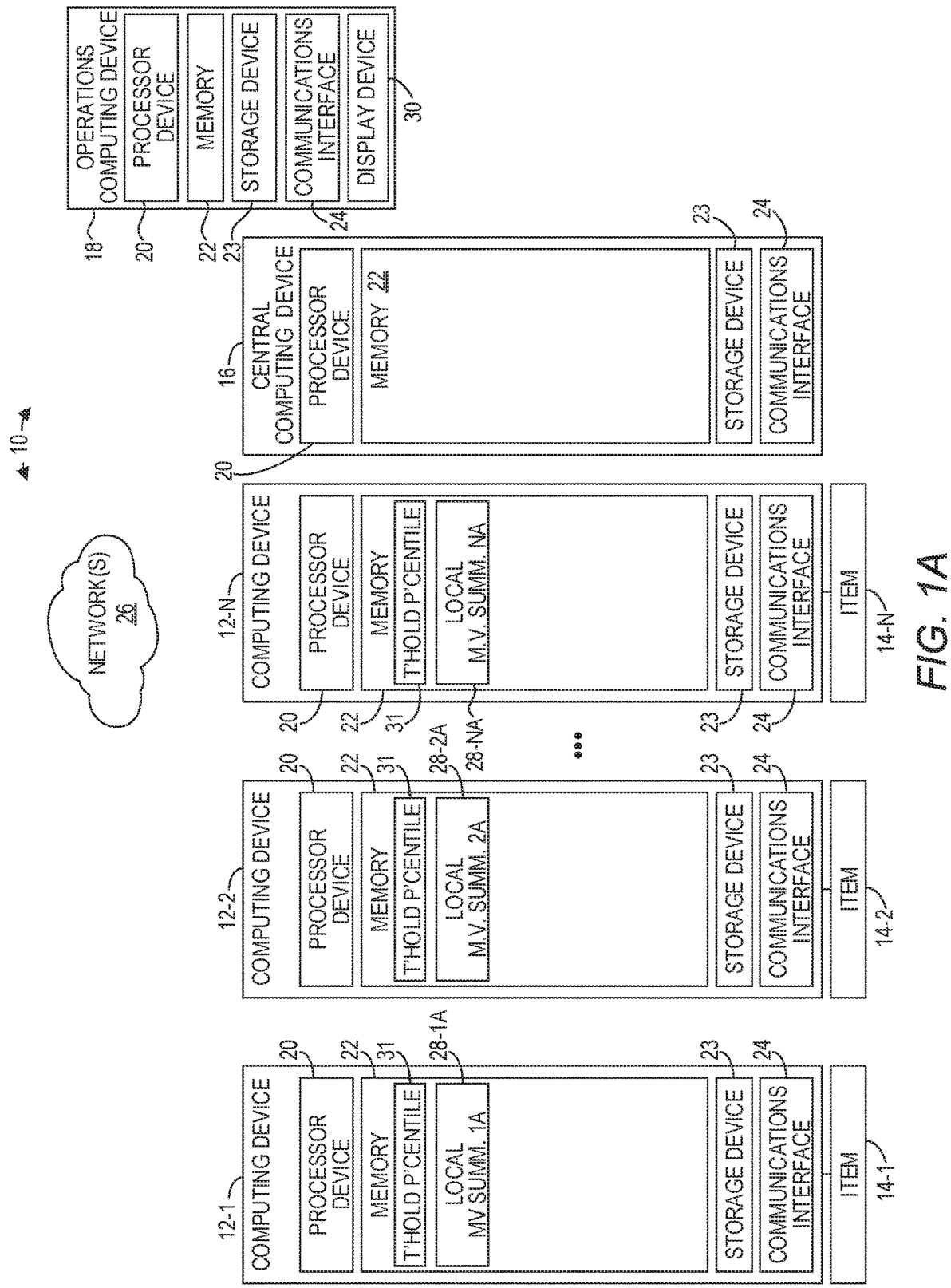
FIGS. 1A-1E illustrate at successive time periods a system suitable for implementing distributed anomaly detection using measurement value summaries according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

To determine whether a measurement of an attribute of some item, such as a response time of a database, or a concentration of a chemical in a body of water, or an amount of vibration generated by a piece of machinery, is a statistical outlier and therefore warranting of attention, it is necessary to know historical measurements of the attribute. It may also be helpful to know the measurements of identical attributes of the same type of item that are being measured, or have been measured, in a substantially similar environment by other measuring devices.

However, maintaining historical measurement information, particularly where measurements may be taken multiple times a second for example, can require substantial storage space. Moreover, obtaining measurement information from other measurement devices may take substantial network bandwidth, and requires even greater storage space. Moreover, certain types of measurement devices may have extremely limited storage space and/or communication capabilities. For example, for cost purposes or otherwise an entity may use measurement devices that have very limited storage space and/or communication capabilities to measure hundreds or thousands of different locations in a large body of water.

The examples implement distributed anomaly detection using measurement value summaries. The examples facilitate a very efficient mechanism for maintaining a history of measurements of an item being measured by a measurement device, and for obtaining combined histories of measurements of the same item, or a same type of item, generated by other measurement devices.

In particular, the examples include a measurement device that generates a local measurement value summary that is configured to maintain a summarization of a plurality of measurement values. In some examples, the measurement value summary does not increase in size as additional measurements are added to the local measurement value summary. A central computing device obtains the local measurement value summaries from a plurality of measurement devices. Each of the local measurement value summaries maintains a summarization of a plurality of measurement values of the same item being measured by the plurality of measurement devices, or a same type of item being measured.

The central computing device combines the local measurement value summaries into a global combined measurement value summary. The central computing device distributes the global combined measurement value summary to each of the plurality of measurement devices, which then utilize the global combined measurement value summary to identify outlier or anomaly measurement values.

In some examples, the central computing device may analyze the plurality of local measurement value summaries to determine if one or more of the local measurement value summaries identify summarizations that are significantly different from a majority of the local measurement value summaries. In such event, the central computing device may generate an alert or other message identifying the measurement devices as warranting an examination.

FIGS. 1A-1E illustrate at successive time periods a system 10 suitable for implementing distributed anomaly detection using measurement value summaries according to one example. Referring first to FIG. 1A, the system 10 includes a plurality of computing devices 12-1, 12-2-12-N (generally, computing devices 12, sometimes referred to herein as measurement devices) that each obtain measurement values of corresponding items 14-1, 14-2-14-N that are being measured. In some examples, the computing devices 12 may be measuring the same item 14, such as different locations within the same body of water, or different locations on a same physical piece of machinery. In other examples, the computing devices 12 may be measuring a same type of item, such as a response time of the same database or a response time of the same application or type of application, or a rotation speed of a rotating shaft of a same type of machine, in which case the items 14-1, 14-2-14-N may be different items.

The manner in which the computing devices 12 obtain the measurement values may differ depending on the type of item being measured. In some examples, the computing devices 12 may include, or be communicatively coupled to, a sensor that generates sensor values that quantify an attribute of an item 14, such as a concentration of a chemical in a fluid, a temperature, a pressure, a rotational speed of a shaft, or the like. In other examples the computing devices 12 may generate the measurement values, such as by determining a response time of a transaction, or a utilization of a resource executing on the corresponding computing device 12, or the like.

The system 10 also includes a central computing device 16 and an operations computing device 18, each of which will be discussed in greater detail herein. The computing devices 12, the central computing device 16 and the operations computing device 18 each include a processor device 20, a memory 22, a storage device 23 and a communications interface 24. The computing devices 12, the central computing device 16 and the operations computing device 18 may be capable of communicating with one another via one or more networks 26.

Over a first period of time, such as minutes, hours, days or weeks, the computing device 12-1 obtains a plurality of measurement values of the item 14-1. The measurement values could be any value that quantifies a metric associated with the item 14-1, such as a response time of a remote application or database, a processor utilization, an amount of memory, a temperature, a speed, or the like. The measurement values may be obtained, by way of non-limiting example, periodically, intermittently, or in response to some stimulus or event. Over the first period of time the computing device 12-1 generates a local measurement value (M.V.) summary 28-1A that is configured to maintain a summary of the plurality of measurement values, and which can be queried to determine whether the new measurement value is an anomalous measurement value. The term "local" in this context refers to a measurement value summary that maintains a summary of measurement values of a single item 14 measured by a particular measurement device.

The term "measurement value summary" as used herein refers to a data structure, and in some examples, related functions for performing operations on the data structure, such as creating, modifying and querying the data structure, that maintains a mathematical summary, such as a distribution, of a plurality of measurement values, and that is parallel and has a bounded physical size. The measurement value summary may, for example, maintain a shape of the distribution of previous measurement values, and thereby maintain information regarding what "expected" measurement values are. The term "parallel" as used in reference to the measurement value summary refers to a characteristic wherein two measurement value summaries can be combined (i.e., are combinable) and the size of the combined measurement value summary is no greater than a bounded physical size, irrespective of the number of measurement values summarized in either of the two measurement value summaries, and that, when queried, will return substantially the same result, such as a statistical metric, that would be returned if the combined measurement summary were generated incrementally by the individual measurement values summarized in the two measurement value summaries. The term "bounded physical size" as used in reference to the measurement value summary refers to a characteristic wherein a maximum physical size of the measurement value summary may be designated, and the measurement value summary will not exceed the maximum physical size irrespective of the number of measurement values summarized in the measurement value summary.

In some examples the measurement value summary may also be incremental. The term "incremental" as used in reference to the measurement value summary refers to a characteristic wherein a measurement value can be individually added to the measurement value summary, and the measurement value summary will represent the union of each preceding measurement value and the added measurement value without a need to recalculate the measurement value summary with each previously received measurement value.

Examples of measurement value summaries include, for example, a t-digest described at github.com/tdunning/t-digest, a moment-based quantile sketch disclosed in "Moment-Based Quantile Sketches for Efficient High Cardinality Aggregation Queries," Edward Gan et al., available at www.vldb.org/pvldb/vol11/p1647-gan.pdf, and online mean and variance estimates including online statistical moment computations, as disclosed, for example in "Numerically Stable, Scalable Formulas for Parallel and Online Computation of Higher-Order Multivariate Central Moments with Arbitrary Weights," Pebay, et al. available at www.osti.gov/servlets/purl/1427275.

The local measurement value summary 28-1A does not store each new measurement value, but rather uses each new measurement value to update the information that maintains a summarization of the plurality of measurement values. The local measurement value summary 28-1A can also be combined with other local measurement value summaries 28-2A, 28-NA generated, for example, by the computing devices 12-2-12-N.

The technology package used to generate and update the local measurement value summary 28-1A may include access routines that access, manipulate and/or query the local measurement value summary 28-1A. For example, to add a new measurement value to the local measurement value summary 28-1A, the computing device 12-1 may invoke a particular method or function of the technology package and provide the local measurement value summary 28-1A and the new measurement value as parameters, and receive in return an updated local measurement value summary 28-1A. To query a measurement value against the local measurement value summary 28-1A, the computing device 12-1 may invoke a different method or function of the technology package and provide the local measurement value summary 28-1A and the new measurement value as parameters, and receive, in return, a statistical metric, such as a quantile estimate, identifying a percentile of the new measurement value based on the cumulative distribution of the plurality of measurement values maintained in the local measurement value summary 28-1A.

With each newly obtained measurement value, the computing device 12-1 can query the local measurement value summary 28-1A using the newly obtained measurement value to determine whether the newly obtained measurement value is an anomalous measurement value. If the newly obtained measurement value is an anomalous measurement value, the computing device 12-1 may, for example, send an alert or other message to the operations computing device 18 for presentation on a display device 30, or take some other action. The computing device 12-1 may utilize any desired criteria to determine what constitutes an anomalous measurement value. In one example, where the local measurement value summary 28-1A comprises, for example, a quantile summary such as a t-digest, the computing device 12-1 may maintain a threshold percentile 31 that identifies a quantile, or range of quantiles, within which, or outside of which, constitute an anomalous measurement value. A quantile summary maintains a cumulative distribution of the measurement values. It will be noted that the quantiles may be characterized in terms of quantiles, percentiles, centiles, or the like. For example, the threshold percentile 31 may indicate that any measurement value that is in a quantile greater than 90 or less than 10 is an anomalous measurement value. However, the examples are not limited to quantiles or percentiles, and in other implementations wherein the local measurement value summary 28-1A is not a quantile summary, the computing device 12-1 may, by way of non-limiting examples, utilize any statistical metric or combination of metrics, such as standard deviations, or one or more of a mean, a variance, skewness, a kurtosis, a hyperskewness, or a hypertailedness to determine whether a measurement value is an anomalous measurement value. Note that throughout the examples disclosed herein, a quantile estimate statistical metric is used solely for purposes of illustration.

Over the first period of time the computing device 12-2 similarly obtains a plurality of measurement values of the item 14-2 and generates the corresponding local measurement value summary 28-2A, and the computing device 12-N obtains a plurality of measurement values of the item 14-N and generates the corresponding local measurement value summary 28-NA.

Figure 1B:
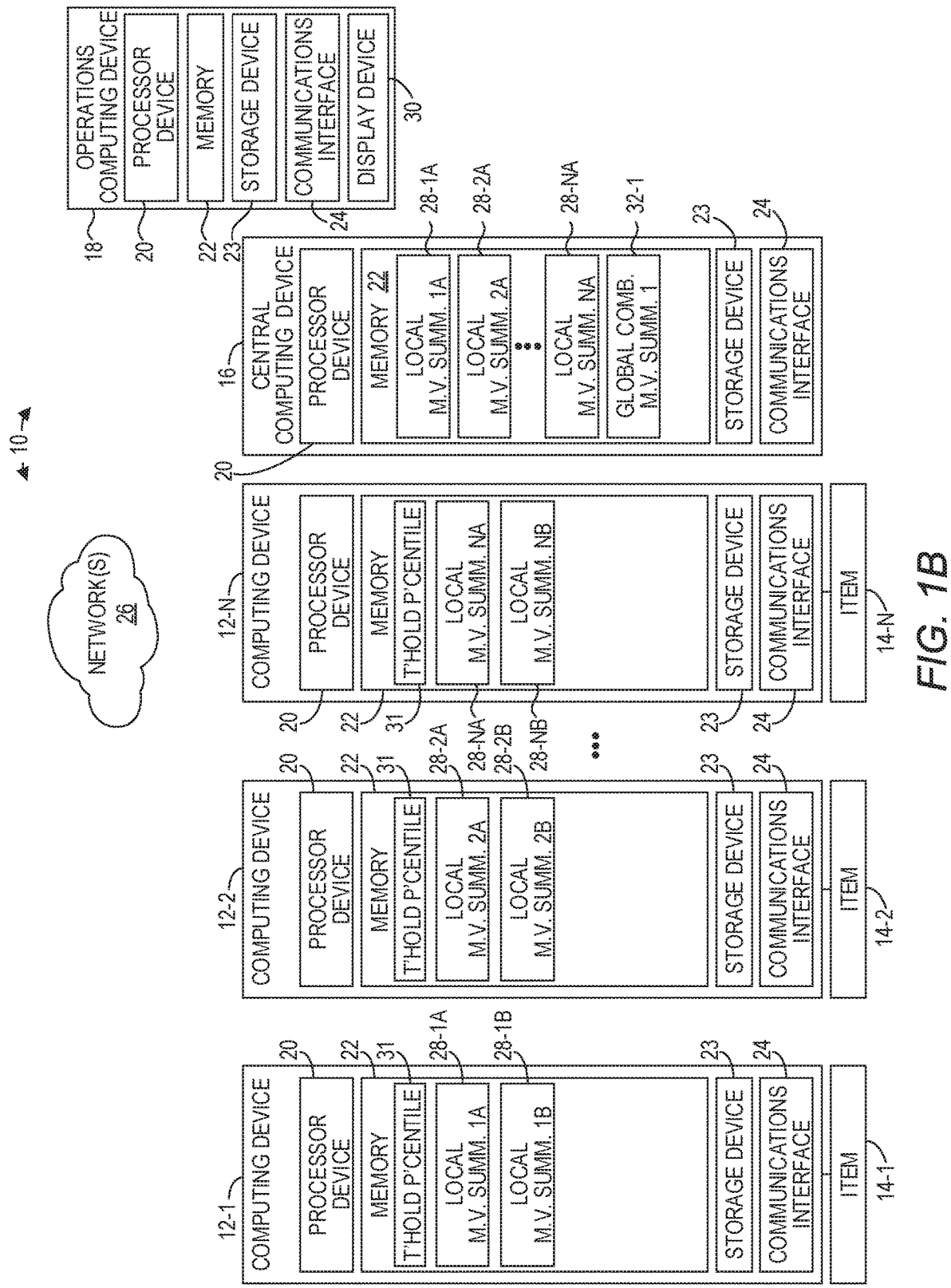

Referring now to FIG. 1B, the computing devices 12-1-12-N send the corresponding local measurement value summaries 28-1A, 28-2A and 28-NA to the central computing device 16. The computing devices 12-1-12-N may send the local measurement value summaries 28-1A-28-NA to the central computing device 16 in response to a request from the central computing device 16, or in response to some other event. In some examples, the computing devices 12-1-12-N may send the local measurement value summaries 28-1A-28-NA to the central computing device 16 periodically, or after obtaining a certain number of measurement values, or at a certain time each day, or in response to some other criterion. In some examples the computing devices 12-1-12-N may send the local measurement value summaries 28-1A-28-NA at different times and different dates. In other examples, the computing devices 12-1-12-N may send the local measurement value summaries 28-1A-28-NA to the central computing device 16 substantially concurrently with one another.

After sending the local measurement value summaries 28-1A-28-NA to the central computing device 16, the computing devices 12-1-12-N generate local measurement value summaries 28-1B, 28-2B and 28-NB. The local measurement value summaries 28-1B, 28-2B and 28-NB maintain corresponding summarizations, in this example cumulative distributions, of new measurement values obtained after sending the local measurement value summaries 28-1A-28-NA to the central computing device 16. Due to the combinable nature of the local measurement value summaries 28-1A and 28-1B, the computing device 12-1 may, for each new measurement value, use the combination of the cumulative distribution maintained in the local measurement value summary 28-1A and the local measurement value summary 28-1B to determine the quantile estimate of the new measurement value to determine whether the new measurement value is an anomalous measurement value. The computing devices 12-2-12-N may process new measurement values similarly.

The central computing device 16 receives the local measurement value summaries 28-1A-28-NA and combines them into a single global combined measurement value summary 32-1. The central computing device 16 may weight the local measurement value summaries 28-1A-28-NA according to a number of measurement values represented in the corresponding local measurement value summaries 28-1A-28-NA during the combining process. The number of measurement values may be identified in the local measurement value summaries 28-1A-28-NA or may be provided by the computing devices 12-1-12-N to the central computing device 16 in conjunction with sending the local measurement value summaries 28-1A-28-NA to the central computing device 16, since the individual measurement values are not maintained in the local measurement value summaries 28-1A-28-NA.

The central computing device 16 may also compare each local measurement value summary 28-1A-28-NA to the global combined measurement value summary 32-1, or to previous global combined measurement summaries, to determine whether any local measurement value summary 28-1A-28-NA substantially deviates from the global combined measurement value summary 32-1. A local measurement value summary 28-1A-28-NA that deviates substantially from the global combined measurement value summary 32-1 may indicate that the item 14-1-14-N that corresponds to the local measurement value summary 28-1A-28-NA warrants examination. Alternatively, a local measurement value summary 28-1A-28-NA that deviates substantially from the global combined measurement value summary 32-1 may indicate a problem with the device generating the measurement values, such as the corresponding computing device 12-1-12-N, or a corresponding sensor. The central computing device 16 may generate an alert, or other message, and send the message to the operations computing device 18 identifying the deviation and the computing device 12-1-12-N that corresponds to the local measurement value summary 28-1A-28-NA that deviates.

Figure 1C:
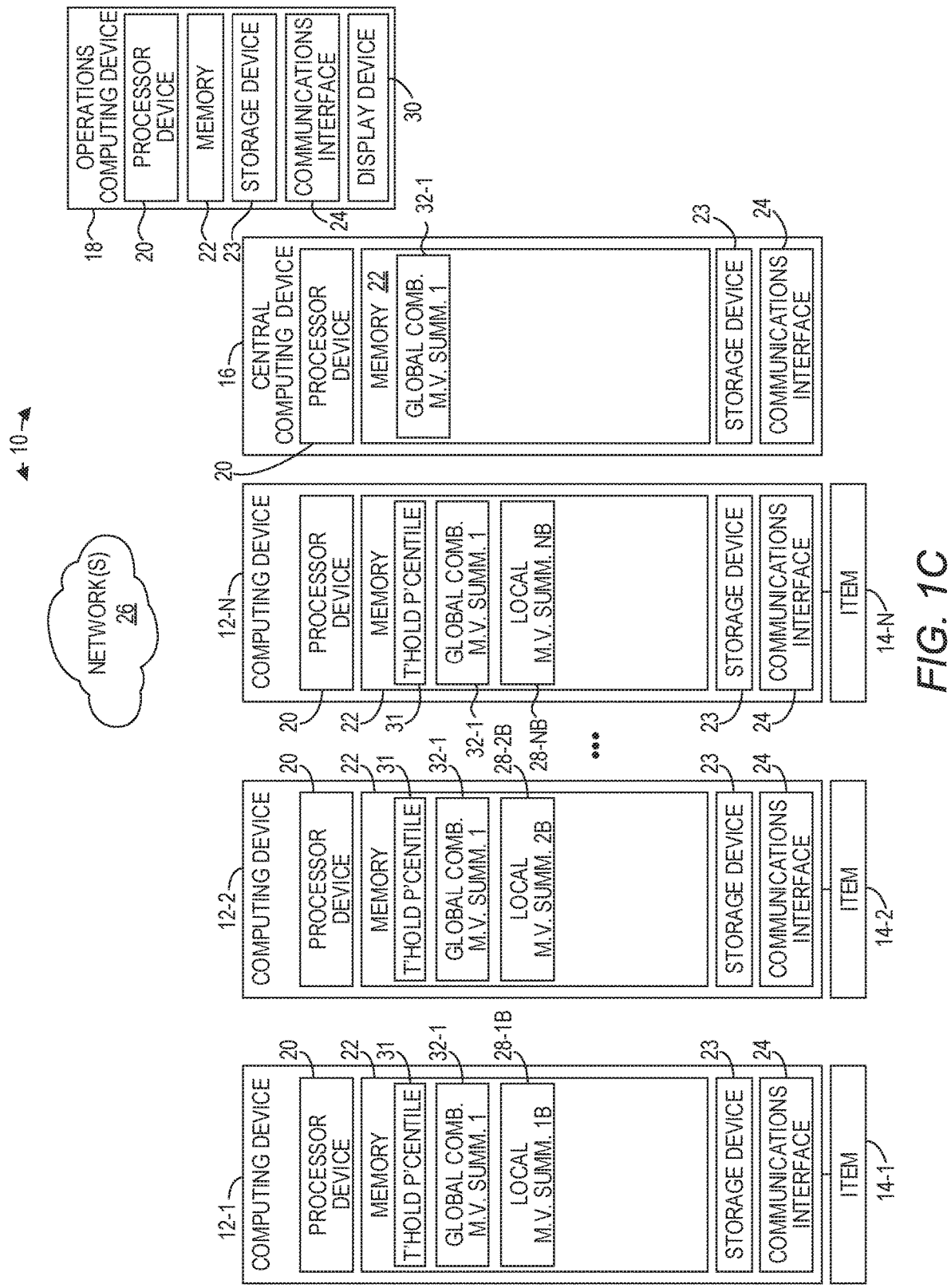

Referring now to FIG. 1C, the central computing device 16 sends the global combined measurement value summary 32-1 to the computing devices 12-1-12-N for use in determining whether subsequent measurement values are desired measurement values. The computing devices 12-1-12-N receive the global combined measurement value summary 32-1. While for purposes of illustration the local measurement value summaries 28-1A-28-NA are illustrated as being discarded, in some examples the local measurement value summaries 28-1A-28-NA may be retained by the corresponding computing devices 12-1-12-N for trend analysis, or the like.

The computing device 12-1 obtains another measurement value of the item 14-1. The computing device 12-1 updates the local measurement value summary 28-1B with the new measurement value. The computing device 12-1 may then combine the global combined measurement value summary 32-1 with the local measurement value summary 28-1B and determine the quantile estimate of the new measurement value based on the combination of the global combined measurement value summary 32-1 and the local measurement value summary 28-1B in order to determine whether the new measurement value is an anomalous measurement value.

The combination of the global combined measurement value summary 32-1 and the local measurement value summary 28-1B can be accomplished in a number of different ways. In one example, upon receipt of the global combined measurement value summary 32-1, the computing device 12-1 adds (i.e., combines) the local measurement value summary 28-1B to the global combined measurement value summary 32-1. Subsequently, the computing device 12-1 adds each new measurement value to each of the global combined measurement value summary 32-1 and the local measurement value summary 28-1B, and tests each new measurement value against the global combined measurement value summary 32-1. In another example, the computing device 12-1 may, for each new obtained measurement value, add the new measurement value to the local measurement value summary 28-1B, then generate a temporary combined measurement value summary by combining the global combined measurement value summary 32-1 with the local measurement value summary 28-1B. The computing devices 12-2-12-N operate similarly.

Figure 1D:
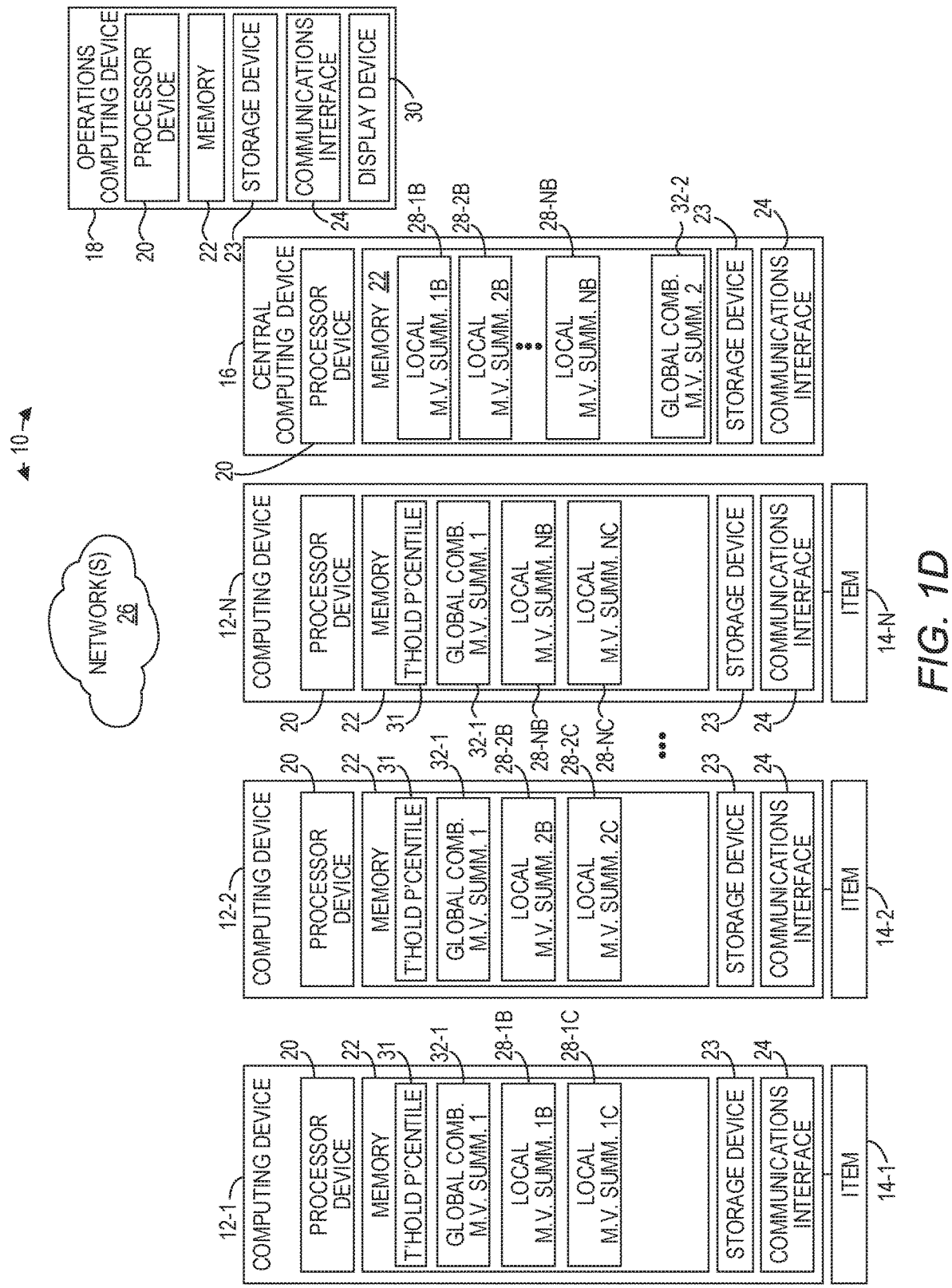

Referring now to FIG. 1D, the central computing device 16 sends a message to each of the computing devices 12-1-12-N requesting the most recent local measurement value summaries that were not yet sent to the central computing device 16. The computing devices 12-1-12-N send the local measurement value summaries 28-1B-28-NB to the central computing device 16.

After sending the local measurement value summaries 28-1B-28-NB to the central computing device 16, the computing devices 12-1-12-N generate local measurement value summaries 28-1C, 28-2C and 28-NC. The local measurement value summaries 28-1C-28-NC maintain corresponding summarizations of new measurement values obtained after sending the local measurement value summaries 28-1B-28-NB to the central computing device 16. The central computing device 16 receives the local measurement value summaries 28-1B-28-NB and combines them into a single global combined measurement value summary 32-2.

Figure 1E:
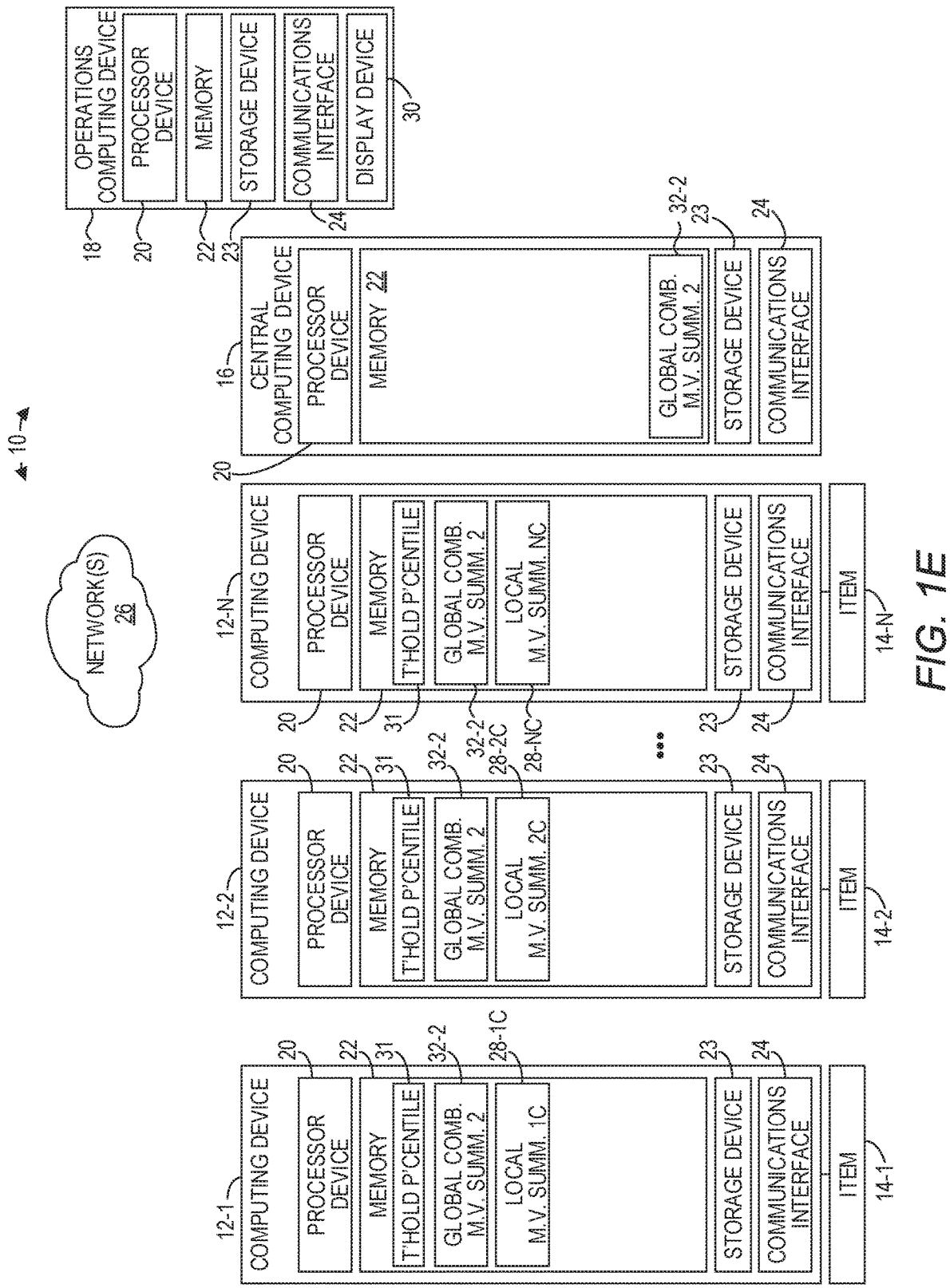

Referring now to FIG. 1E, the central computing device 16 sends the global combined measurement value summary 32-2 to the computing devices 12-1-12-N for use in determining whether subsequent measurement values are desired measurement values. The computing devices 12-1-12-N receive the global combined measurement value summary 32-2. Again, while for purposes of illustration the local measurement value summaries 28-1B-28-NB are illustrated as being discarded, in some examples the local measurement value summaries 28-1A-28-NA and local measurement value summaries 28-1B-28-NB may be retained by the corresponding computing devices 12-1-12-N for trend analysis, or the like.

The computing device 12-1 obtains another measurement value of the item 14-1. The computing device 12-1 updates the local measurement value summary 28-1C with the new measurement value. The computing device 12-1 may then combine the global combined measurement value summary 32-2 with the local measurement value summary 28-1C and determine the quantile estimate of the new measurement value based on the combination of the global combined measurement value summary 32-2 and the local measurement value summary 28-1C, as discussed above with regard to the global combined measurement value summary 32-1 and the local measurement value summary 28-1B, to thereby determine whether the new measurement value is an anomalous measurement value.

Figure 2:
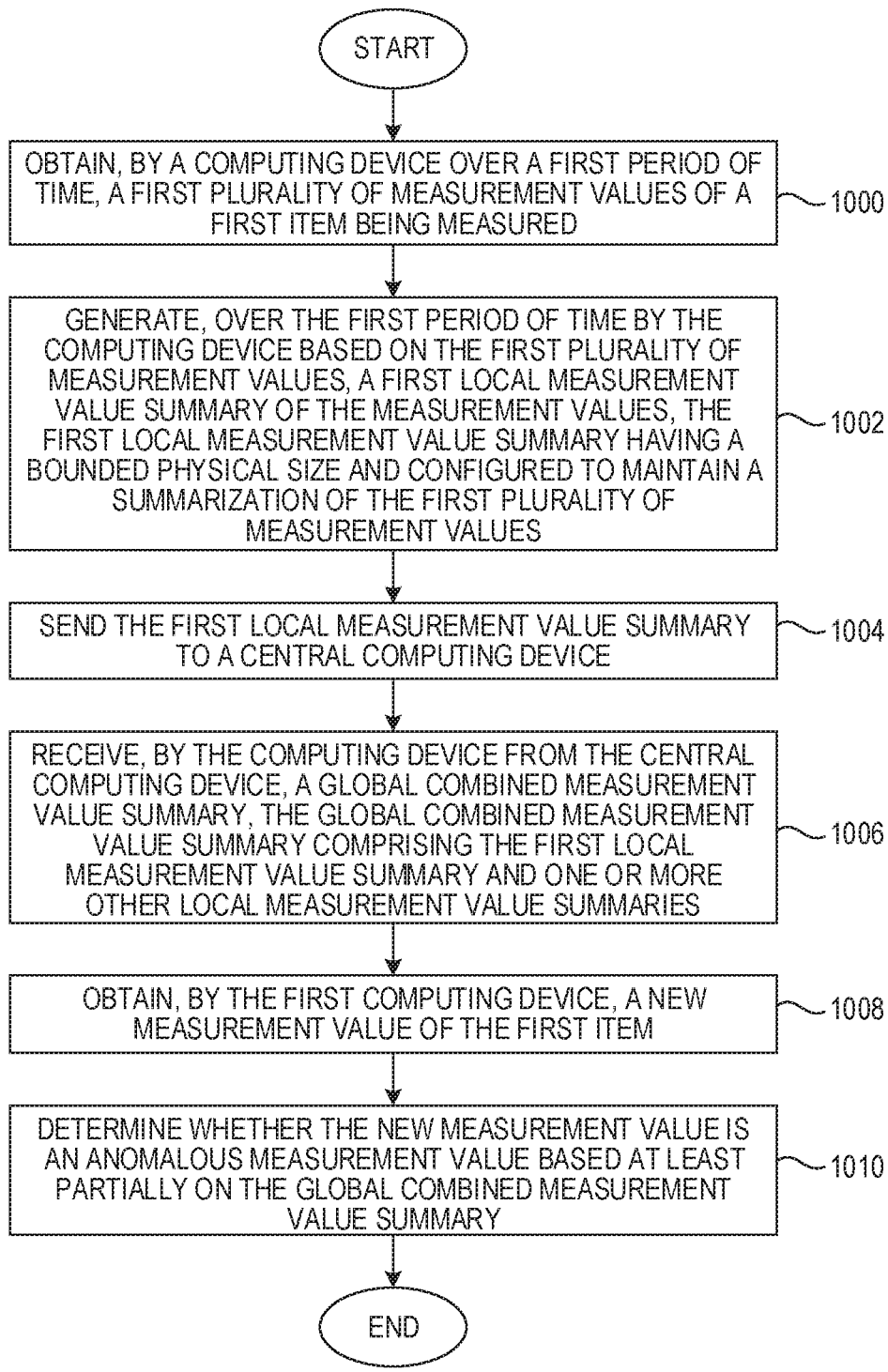
FIG. 2 is a flowchart of a method for implementing distributed anomaly detection using measurement value summaries from the perspective of a measurement device according to one example.

FIG. 2 is a flowchart of a method for implementing distributed anomaly detection using measurement value summaries from the perspective of a measurement device, such as the computing device 12-1, according to one example. FIG. 2 will be discussed in conjunction with FIGS. 1A-1E. The computing device 12-1 obtains, over a first period of time, a first plurality of measurement values of the item 14-1 (FIG. 2, block 1000). The computing device 12-1 generates, over the first period of time, the local measurement value summary 28-1A of the measurement values, the local measurement value summary 28-1A configured to maintain a summarization of the first plurality of measurement values (FIG. 2, block 1002). The computing device 12-1 sends the local measurement value summary 28-1A to the central computing device 16 (FIG. 2, block 1004). The computing device 12-1 receives, from the central computing device 16, the global combined measurement value summary 32-1, the global combined measurement value summary 32-1 comprising the local measurement value summary 28-1A and the local measurement value summaries 28-2A-28-NA (FIG. 2, block 1006). The computing device 12-1 obtains a new measurement value of the item 14-1 (FIG. 2, block 1008). The computing device 12-1 determines whether the new measurement value of the item 14-1 is an anomalous measurement value based at least partially on the global combined measurement value summary 32-1 (FIG. 2, block 1010).

Figure 3:
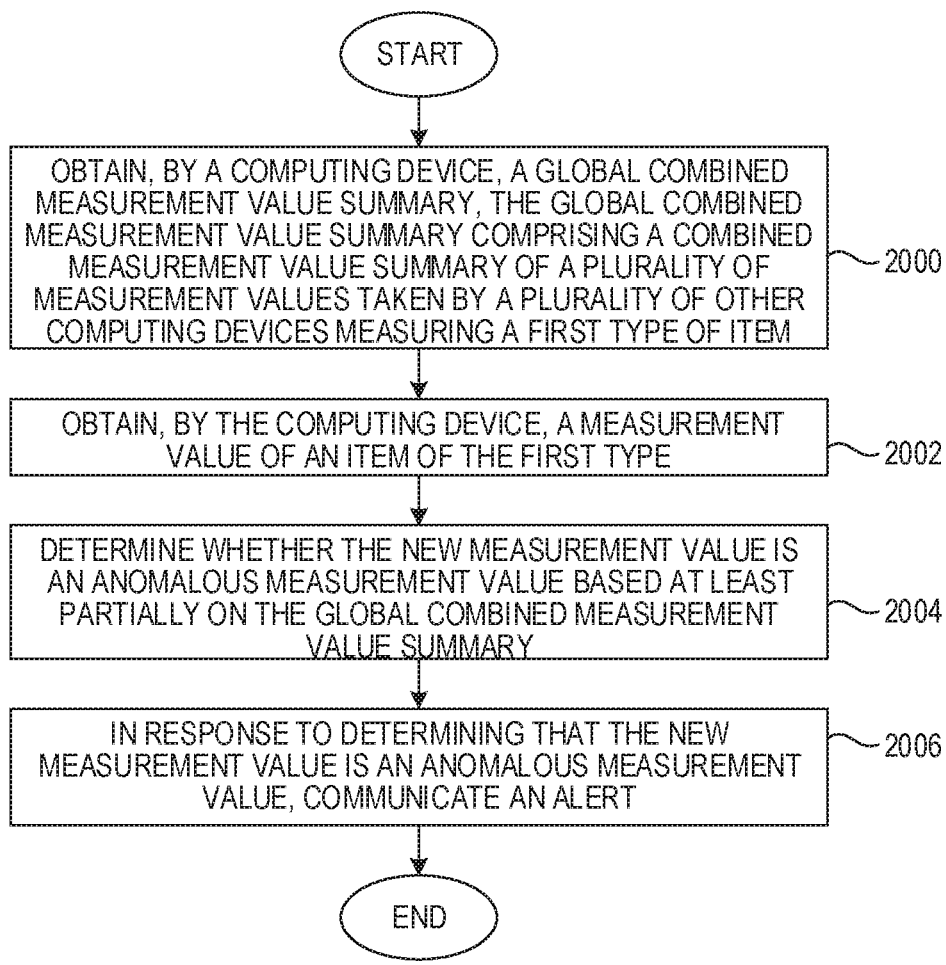
FIG. 3 is a flowchart of a method for implementing distributed anomaly detection using measurement value summaries from the perspective of a measurement device, such as a computing device, according to another example.

FIG. 3 is a flowchart of a method for implementing distributed anomaly detection using measurement value summaries from the perspective of a measurement device, such as the computing device 12-1, according to another example. FIG. 3 will be discussed in conjunction with FIGS. 1A-1E. The computing device 12-1 obtains the global combined measurement value summary 32-1, the global combined measurement value summary 32-1 including the combined measurement value summary of a plurality of measurement values taken by the computing devices 12-2-12-N measuring a first type of item (FIG. 3, block 2000). The computing device 12-1 obtains a measurement value of the item 14-1 of the first type (FIG. 3, block 2002). The computing device 12-1 determines whether the measurement value of the item 14-1 is an anomalous measurement value based at least partially on the global combined measurement value summary 32-1 (FIG. 3, block 2004). The computing device 12-1, in response to determining that the measurement value of the item 14-1 is an anomalous measurement value, communicates an alert (FIG. 3, block 2006).

Figure 4:
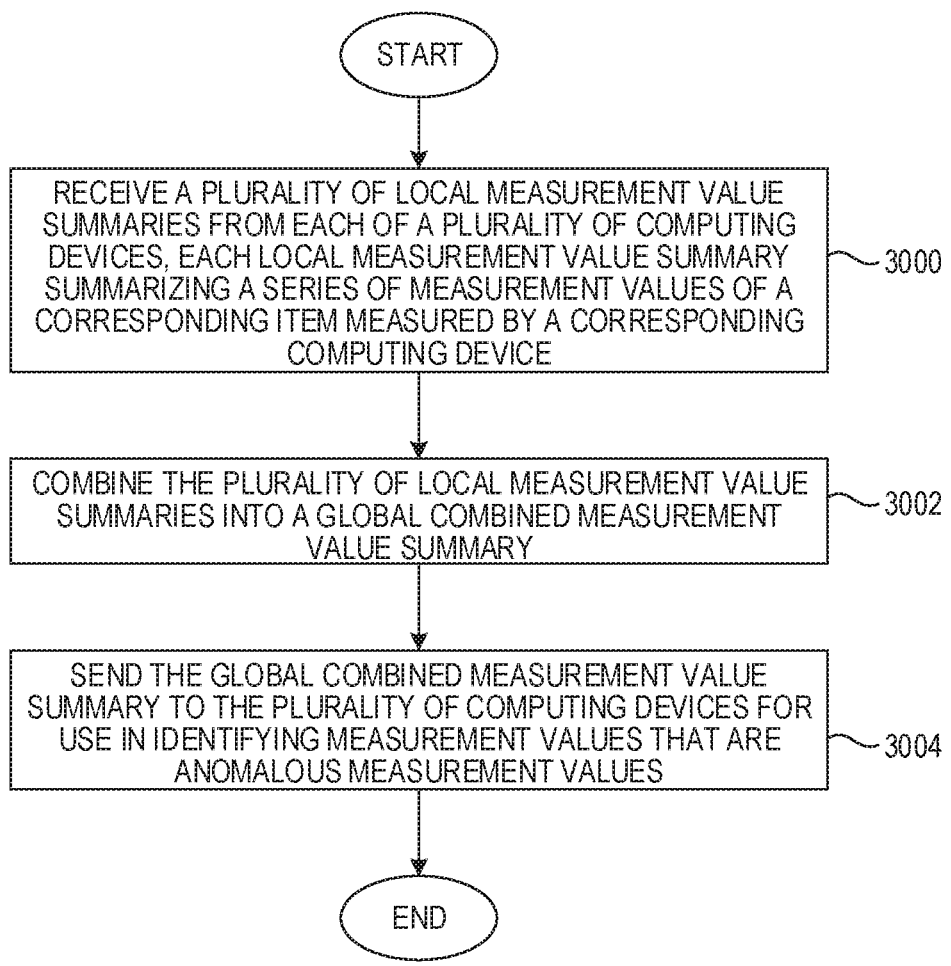
FIG. 4 is a flowchart of a method for implementing distributed anomaly detection using measurement value summaries from the perspective of a central computing device, according to another example.

FIG. 4 is a flowchart of a method for implementing distributed anomaly detection using local measurement value summaries from the perspective of the central computing device 16, according to another example. FIG. 4 will be discussed in conjunction with FIGS. 1A-1E. The central computing device 16 receives the plurality of local measurement value summaries 28-1A-28-1N from the computing devices 12-1-12-N, each local measurement value summary 28-1A-28-1N maintaining a summarization of a series of measurement values of a corresponding item 14-1-14-N being measured (FIG. 4, block 3000). The central computing device 16 combines the plurality of local measurement value summaries 28-1A-28-1N from each of the plurality of computing devices 12-1-12-N into the single global combined measurement value summary 32-1 (FIG. 4, block 3002). The central computing device 16 sends the single global combined measurement value summary 32-1 to the plurality of computing devices 12-1-12-N for use in identifying measurement values that are not desired measurement values (FIG. 4, block 3004).

FIGS. 5A-5D illustrate an example message flow between and actions of various components to implement distributed anomaly detection using combinable measurement value summaries according to one example. For purposes of illustration only the actions of the computing device 12-1 are illustrated in detail, but it should be understood that the computing devices 12-2-12-N may be implementing substantially concurrent actions during substantially the same periods of time. During a period of time T1, the computing device 12-1 creates the local measurement value summary 28-1A (step 4000). The computing device 12-1 obtains a measurement value of the item 14-1 (step 4002). The computing device 12-1 adds the measurement value to the local measurement value summary 28-1A (step 4004). The process of adding measurement values of the item 14-1 to the local measurement value summary 28-1A may involve a mathematical function or other algorithm that continually updates a summarization of measurement values over the period of time T1. It should be noted that the individual measurement values are not separately recorded or stored in the local measurement value summary 28-1A, thus resulting in relatively small storage or memory requirements for the local measurement value summary 28-1A.

The computing device 12-1 tests the measurement value against the local measurement value summary 28-1A to determine if the measurement value is an anomalous measurement value (step 4006). Note that in some implementations this step may not be performed until a predetermined number of measurement values have first been added to the local measurement value summary 28-1A, such as ten measurement values, one hundred measurement values, or any other predetermined number of measurement values.

At the end of the period of time T1, the central computing device 16 sends a request to the computing device 12-1 (and to the computing devices 12-2 and 12-N, not illustrated) to provide the local measurement value summary 28-1A to the central computing device 16 (step 4008). In response, the computing device 12-1 sends the local measurement value summary 28-1A to the central computing device 16 (step 4010).

After sending the local measurement value summary 28-1A to the central computing device 16, the computing device 12-1 generates the local measurement value summary 28-1B (step 4012). Over a period of time T2 that spans the timeframe from generating the local measurement value summary 28-1B and receiving a global combined measurement value summary from the central computing device 16, the computing device 12-1 iteratively obtains measurement values of the item 14-1 and adds the measurement values to the local measurement value summary 28-1B (steps 4012-4016). Because in this example the computing device 12-1 has not yet received a global combined measurement value summary from the central computing device 16, and assuming that the computing device 12-1 retained the local measurement value summary 28-1A, the computing device 12-1 may test the measurement value against a combination of the local measurement value summary 28-1A and the local measurement value summary 28-1B, using the combining techniques discussed above (step 4018). If the computing device 12-1 has discarded the local measurement value summary 28-1A, the computing device 12-1 may test the measurement value solely against the local measurement value summary 28-1B.

Figure 5A:
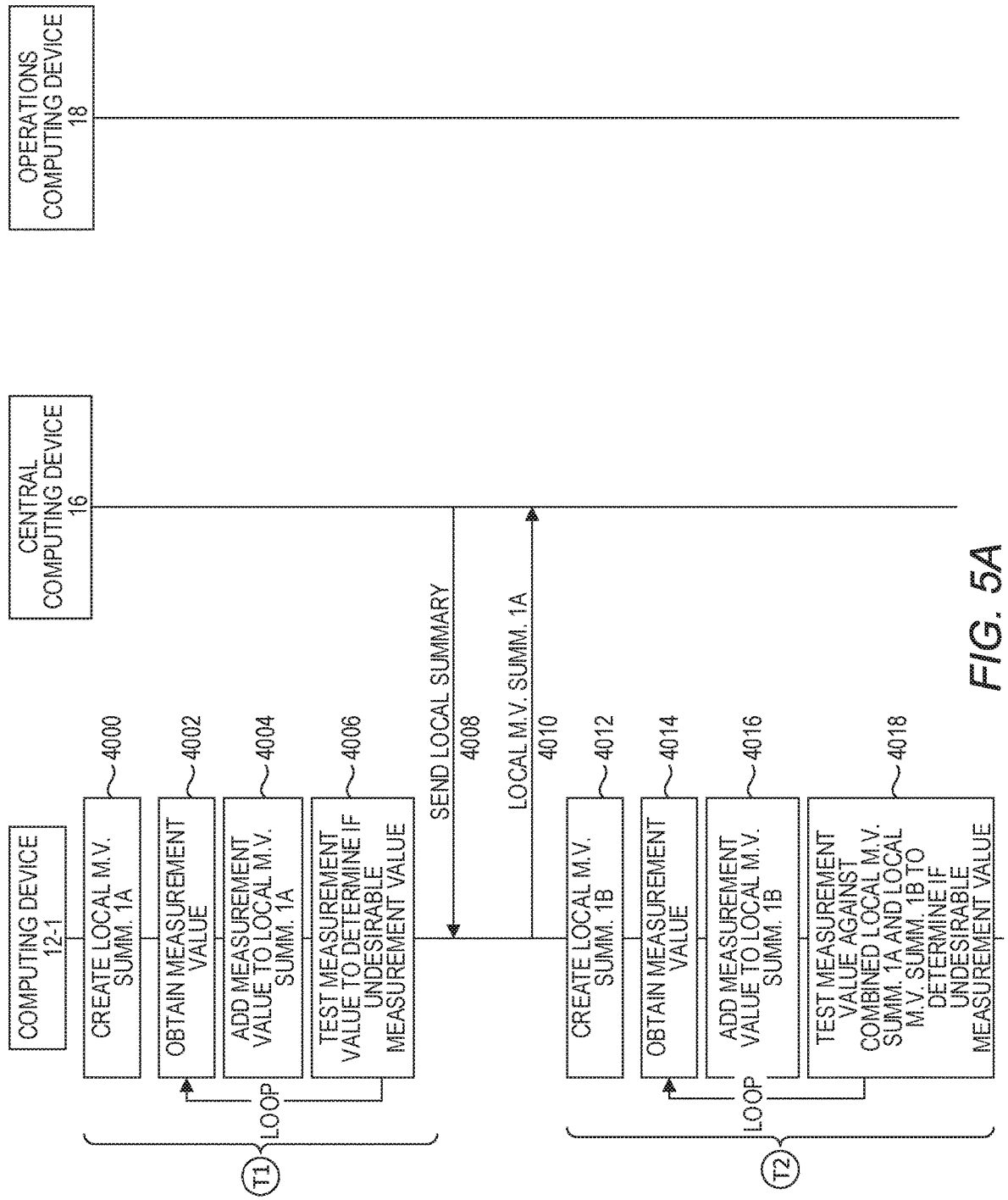
FIGS. 5A-5D illustrate an example message flow between and actions of various components to implement distributed anomaly detection using combinable measurement value summaries according to one example.
Figure 5B:
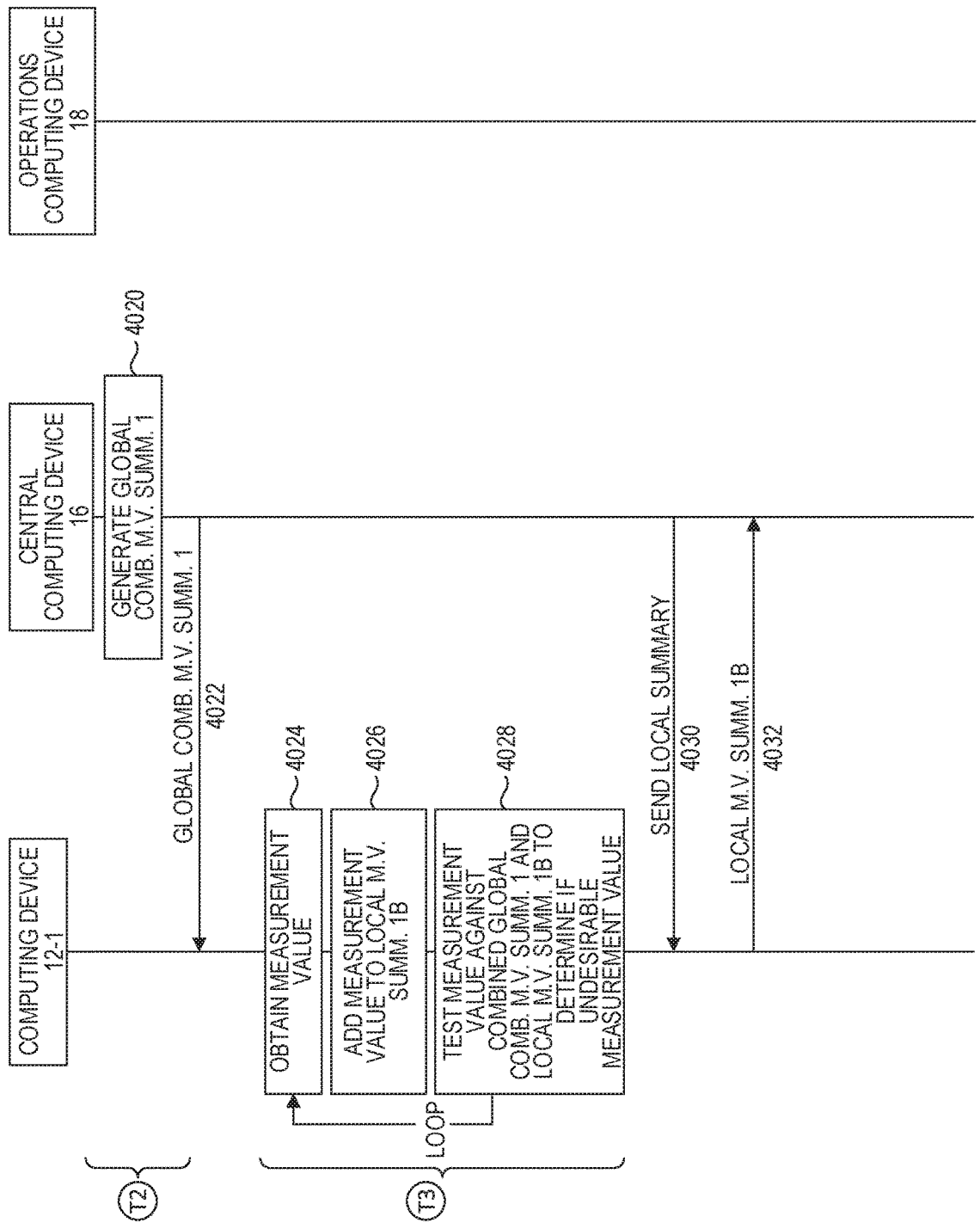

Referring now to FIG. 5B, after the central computing device 16 receives the local measurement value summary 28-1A (and the local measurement value summaries 28-2A-28-2N from the computing devices 12-2-12-N, not illustrated), and during the period of time T2, the central computing device 16 generates the global combined measurement value summary 32-1 (step 4020). The central computing device 16 then sends the global combined measurement value summary 32-1 to the computing devices 12-1-12-N (step 4022).

The computing device 12-1 receives the global combined measurement value summary 32-1 from the central computing device 16. Over a period of time T3, the computing device 12-1 may iteratively obtain a measurement value of the item 14-1 (step 4024), add the measurement value to the local measurement value summary 28-1B (step 4026), and then test the measurement value against a combination of the global combined measurement value summary 32-1 and the local measurement value summary 28-1B to determine whether the measurement value is an anomalous measurement value (step 4028).

As some point in time, the central computing device 16 again sends a request to the computing device 12-1 (and to the computing devices 12-2 and 12-N, not illustrated) to provide the most recent local measurement value summary to the central computing device 16 (step 4030). In response, the computing device 12-1 sends the local measurement value summary 28-1B to the central computing device 16 (step 4032).

Figure 5C:
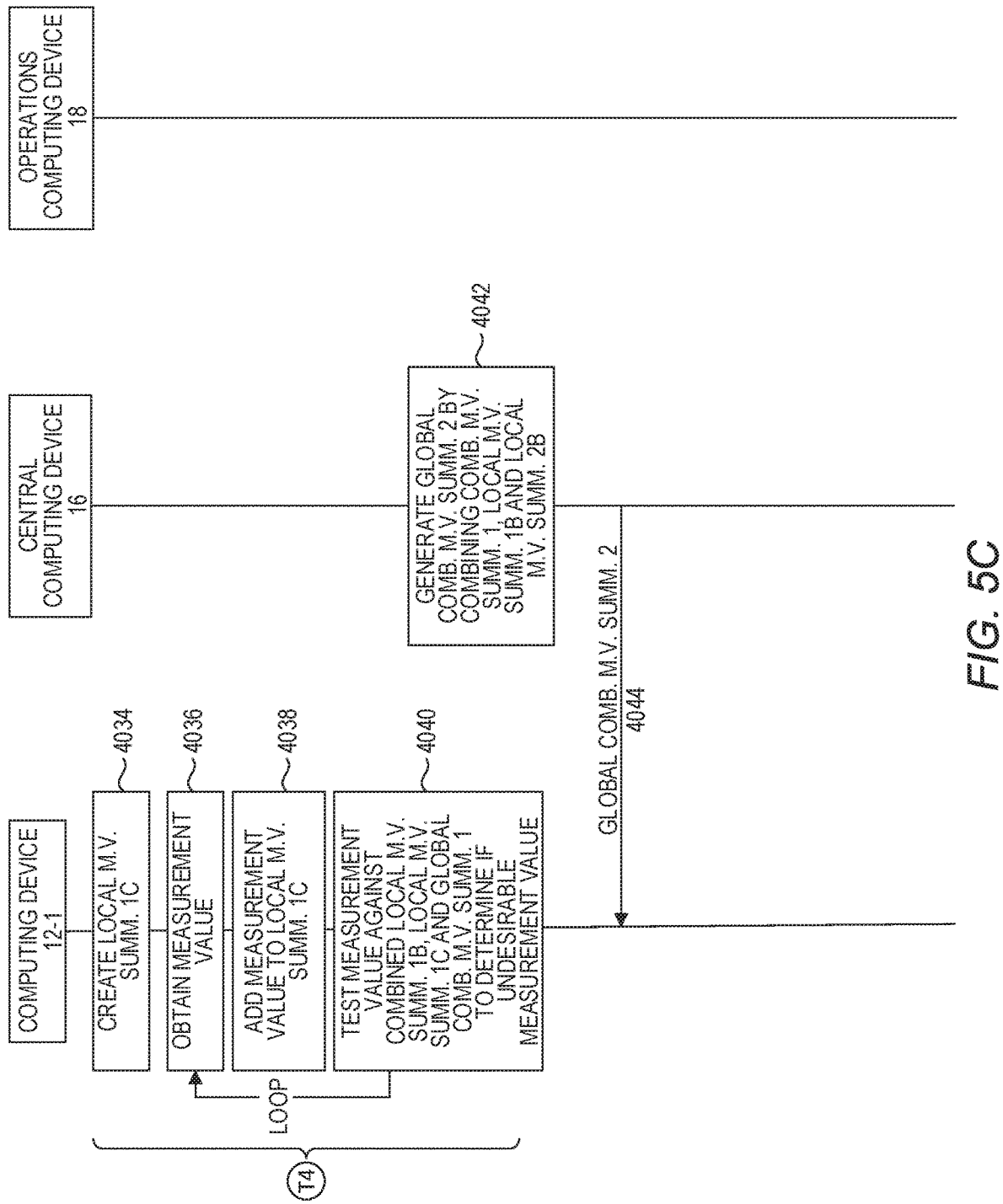

Referring now to FIG. 5C, after sending the local measurement value summary 28-1B to the central computing device 16, the computing device 12-1 generates the local measurement value summary 28-1C (step 4034). Over a period of time T4 that spans the timeframe from generating the local measurement value summary 28-1C and receiving a next global combined measurement value summary 32 from the central computing device 16, the computing device 12-1 iteratively obtains measurement values of the item 14-1 and adds the measurement values to the local measurement value summary 28-1C (steps 4036-4038). Because the global combined measurement value summary 32-1 does not contain the summarization of measurement values reflected in the local measurement value summary 28-1B, the computing device 12-1 may test the measurement values against a combination of the local measurement value summary 28-1B, the global combined measurement value summary 32-1, and the local measurement value summary 28-1C, using the combining techniques discussed above (step 4040). If the computing device 12-1 has discarded the local measurement value summary 28-1B, the computing device 12-1 may test the measurement value solely against a combination of the global combined measurement value summary 32-1 and the local measurement value summary 28-1C.

After the central computing device 16 receives the local measurement value summary 28-1B (and the local measurement value summaries 28-2B-28-NB, not illustrated), and during the period of time T4, the central computing device 16 generates the global combined measurement value summary 32-2 based on the global combined measurement value summary 32-1 and the local measurement value summaries 28-1B-28-NB (step 4042). In some implementations, the central computing device 16 may maintain (e.g., store) measurement value counts for each global combined measurement value summary so that the global combined measurement value summary and the local measurement value summaries are properly weighted during the combination process. The central computing device 16 then sends the global combined measurement value summary 32-2 to the computing devices 12-1-12-N (step 4044).

Figure 5D:
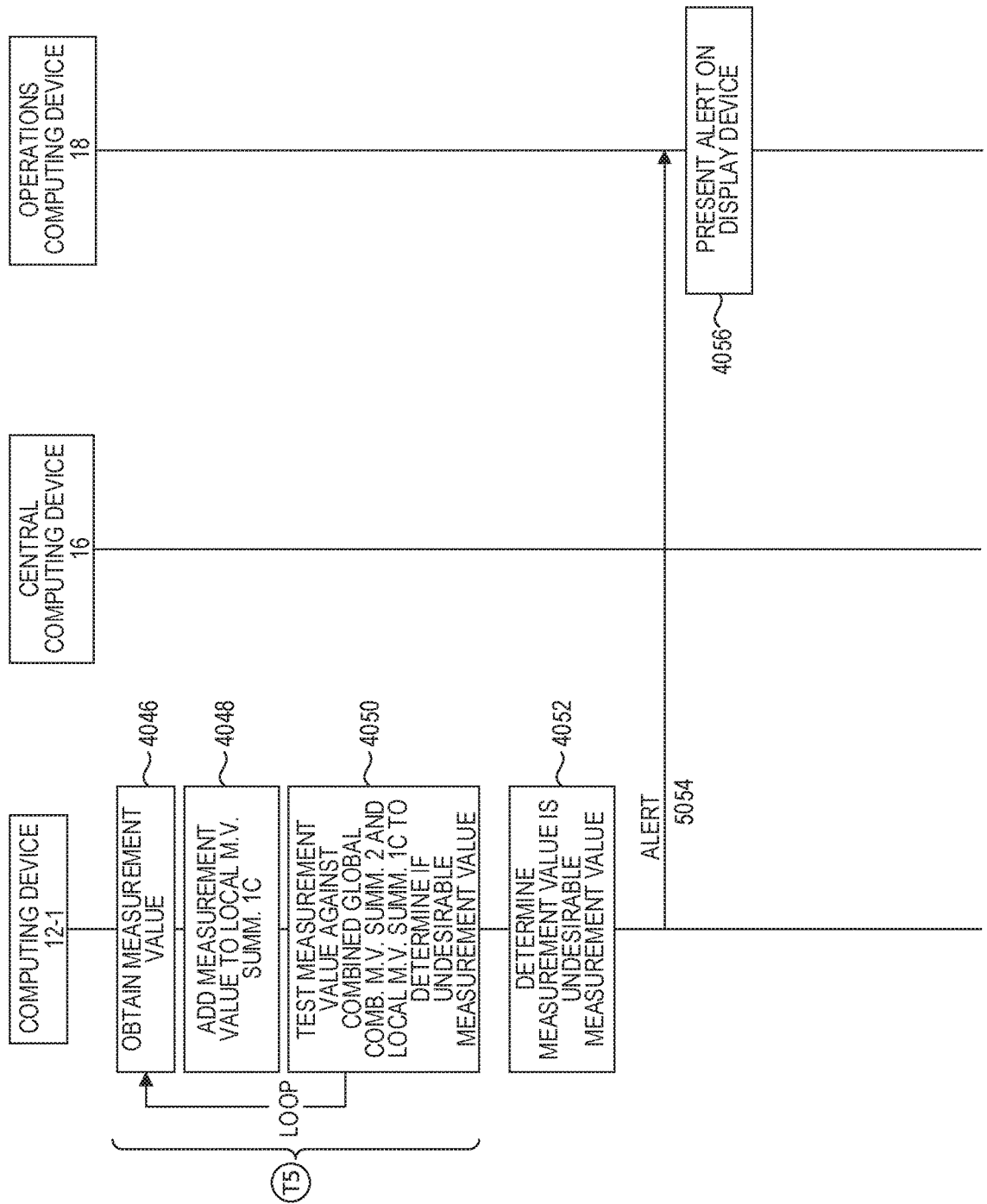

Referring now to FIG. 5D, the computing device 12-1 receives the global combined measurement value summary 32-2 from the central computing device 16. Over a period of time T5, the computing device 12-1 may iteratively obtain measurement values of the item 14-1 (step 4046), add the measurement values to the local measurement value summary 28-1C (step 4048), and then test the measurement value against a combination of the global combined measurement value summary 32-2 and the local measurement value summary 28-1C (step 4050) to determine whether the measurement value is an anomalous measurement value. In this example, the computing device 12-1 determines that a measurement value is an anomalous measurement value (step 4052). For example, the combination of the global combined measurement value summary 32-2 and the local measurement value summary 28-1C may identify the percentile of the measurement value to be greater than the threshold percentile 31 (FIG. 1A). The computing device 12-1 sends an alert to the operations computing device 18 that indicates that the measurement value is an anomalous measurement value (step 4054). The operations computing device 18 presents the alert on the display device 30 (step 4056).

Figure 6:
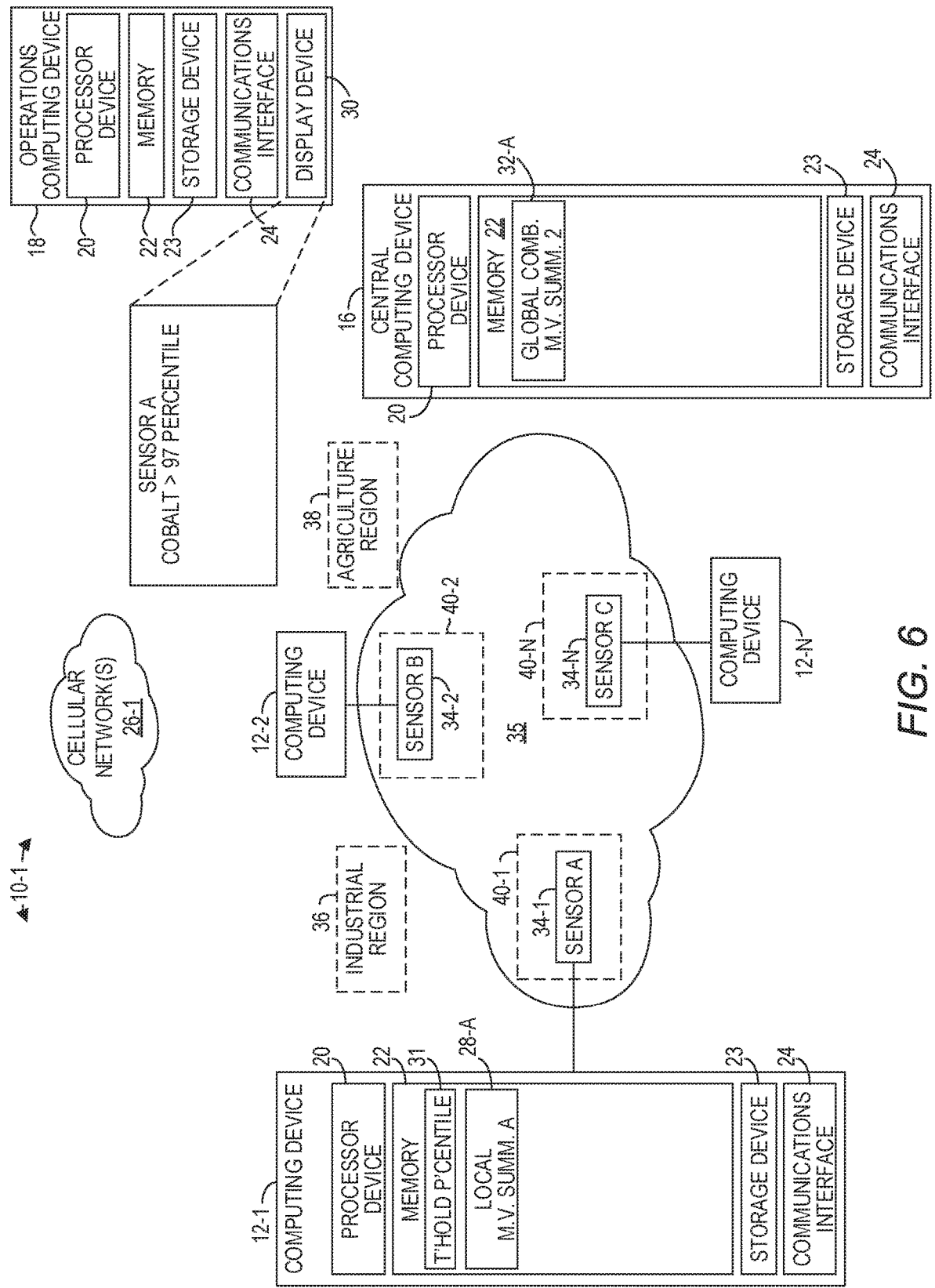
FIG. 6 is block diagram of a system suitable for implementing distributed anomaly detection using measurement value summaries according to another example.

FIG. 6 is a block diagram of a system 10-1 suitable for implementing distributed anomaly detection using measurement value summaries according to another example. The system 10-1 is substantially similar to the system 10 discussed above, except as otherwise noted herein. In this example, the computing devices 12-1-12-N comprise relatively small single-board computing devices, such as Raspberry Pis, Rock64s, BeagleBoards, or the like. Such single-board computers often have limited memory and storage space and thus may particularly benefit from the compact size of the local measurement value summaries and the global combined measurement value summaries discussed herein. The computing devices 12-1-12-N occasionally communicate with the central computing device 16 and the operations computing device 18 via a cellular network 26-1.

In this example, the computing devices 12-1-12-N are coupled respectively to a plurality of sensors 34-1-34-N. The sensors 34-1-34-N sense a characteristic of an item, in this example, a body of water 35. The body of water 35 has an adjacent industrial region 36, which includes a battery manufacturer, and an adjacent agricultural region 38. The sensors 34-1-34-N are configured to sense the body of water 35 at different locations 40-1-40-N, which may, for example, be geographically distant from one another, such as miles from one another. The sensors 34-1-34-N are configured to determine a concentration of one or more chemicals, such as cobalt and nitrogen, in the water sensed at the respective locations 40-1-40-N.

In this example, as the computing device 12-1 initiates, the computing device 12-1 sends a request for a current global combined measurement value summary to the central computing device 16. In this example, a global combined measurement value summary 32-A is the most current global combined measurement value summary, and thus in response, the central computing device 16 sends the global combined measurement value summary 32-A to the computing device 12-1. Thus, in this example, the computing device 12-1 can immediately test new measurement values obtained from the sensor 34-1 against a historical summarization of measurement values previously taken in the body of water 35.

The computing device 12-1 generates a new local measurement value summary 28-A. The computing device 12-1 obtains a measurement value of the body of water 35 at the location 40-1 via the sensor 34-1. In this example, the measurement value identifies a cobalt concentration in the water sensed by the sensor 34-1 at the location 40-1. The computing device 12-1 adds the measurement value to the local measurement value summary 28-A. The threshold percentile 31 in this example indicates that any percentiles greater than the $97^{th}$ percentile are considered anomalous measurement values. The computing device 12-1 determines a quantile estimate of the measurement value based on the global combined measurement value summary 32-A and the local measurement value summary 28-A. The quantile estimate identifies the measurement value as being in the $98^{th}$ percentile, and the computing device 12-1 sends an alert to the operations computing device 18. The operations computing device 18 presents the alert on a display device 30 for viewing by an operator (not illustrated). Over time, the process repeats substantially similarly as discussed above with regard to FIGS. 5A-5D.

Figure 7:
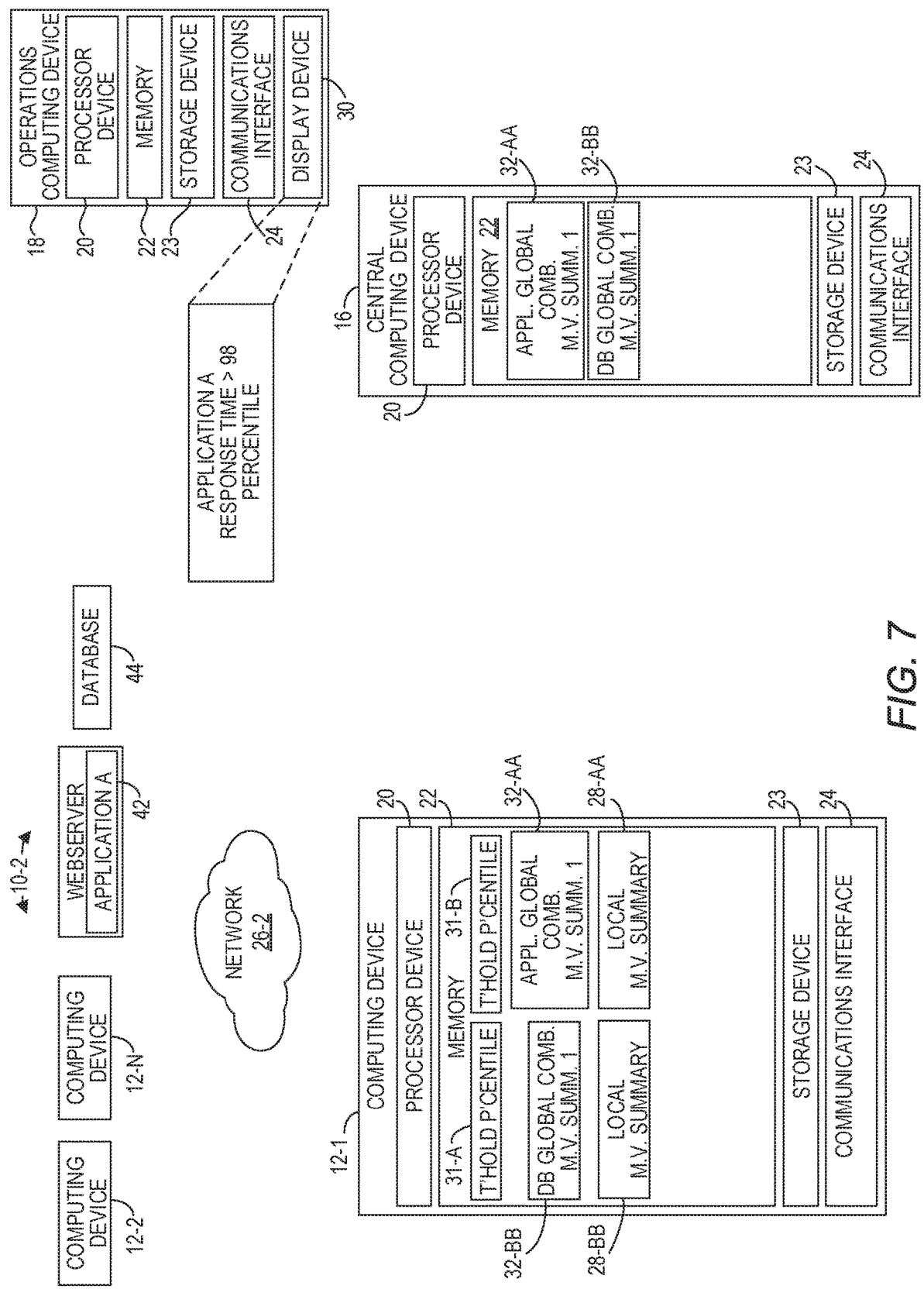
FIG. 7 is block diagram of a system suitable for implementing distributed anomaly detection using measurement value summaries according to another example.

FIG. 7 is a block diagram of a system 10-2 suitable for implementing distributed anomaly detection using measurement value summaries according to another example. The system 10-2 is substantially similar to the systems 10 and 10-1 discussed above, except as otherwise noted herein. In this example, the computing devices 12-1-12-N comprise business computing devices that offer services to end users. In the course of offering such services, the computing devices 12-1-12-N access computing environment resources that include an application 42, such as a webserver application, and a database 44, via a network 26-2. Each of the computing devices 12-1-12-N generates measurement values of a response time of the application 42 and the database 44. The response time may be measured, for example, as the interim of time between sending a request to the application 42 or the database 44, and receiving a corresponding response.

In this example, as the computing device 12-1 initiates, the computing device 12-1 sends a request for a current global combined measurement value summary of response times of the application 42 to the central computing device 16, and a request for a current global combined measurement value summary of response times of the database 44. In response, the central computing device 16 sends a global combined measurement value summary 32-AA and a global combined measurement value summary 32-BB to the computing device 12-1. The global combined measurement value summary 32-AA comprises a summarization of response times of the application 42 in the past, based on local measurement value summaries received from, for example, the computing devices 12-1-12-N. The global combined measurement value summary 32-BB comprises a summarization of response times of the database 44 in the past, based on local measurement value summaries received from the computing devices 12-1-12-N. If this is the first time the computing device 12-1 will be accessing the application 42 and the database 44, the global combined measurement value summary 32-AA and the global combined measurement value summary 32-BB may be based on local measurement value summaries received from the computing devices 12-2-12-N.

The computing device 12-1 generates a new local measurement value summary 28-AA, to which measurement values of the response time of the application 42 can be added, and a new local measurement value summary 28-BB, to which measurement values of the response time of the database 44 can be added. The computing device 12-1 receives input from a user (not illustrated), and in response, sends a request to the application 42 and stores a timestamp identifying the time the request was sent. The application 42 responds to the response. The computing device 12-1 generates another timestamp upon receipt of the request, and determines a measurement value that quantifies the response time of the application 42. The computing device 12-1 adds the measurement value to the local measurement value summary 28-AA. A threshold percentile 31-A in this example indicates that any percentiles greater than the $97^{th}$ percentile should be considered anomalous measurement values. The computing device 12-1 determines a quantile estimate of the measurement value based on the global combined measurement value summary 32-AA and the local measurement value summary 28-AA. The quantile estimate identifies the measurement value as being in the $98^{th}$ percentile, and the computing device 12-1 sends an alert to the operations computing device 18. The operations computing device 18 presents the alert on a display device 30 for viewing by an operator (not illustrated). Over time, the process repeats substantially similarly as discussed above with regard to FIGS. 5A-5D.

Figure 8:
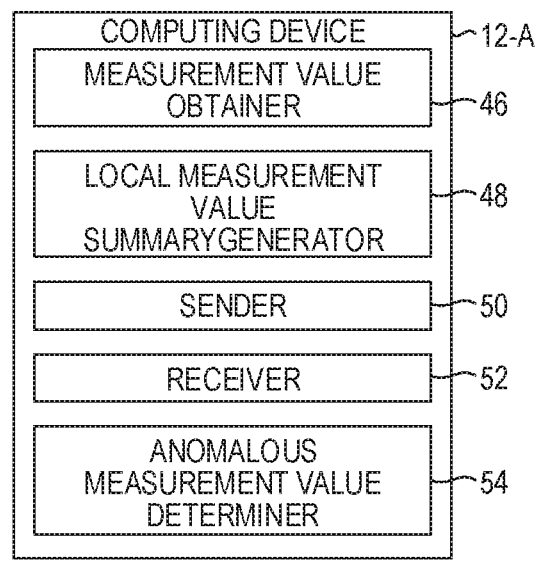
FIG. 8 is a block diagram of a computing device according to another example.

FIG. 8 is a block diagram of a computing device 12-A according to another implementation. The computing device 12-A implements identical functionality as that described above with regard to the computing device 12-1. The computing device 12-A includes a measurement value obtainer 46 that is configured to obtain, over a first period of time, a plurality of measurement values of a first item being measured. The measurement value obtainer 46 may obtain a measurement value, for example, from a sensor or other device that generates measurement values that quantify a desired attribute of an item. In other implementations, such as discussed above with regard to FIG. 7, the measurement value obtainer 46 may obtain a measurement value by generating the measurement value.

The computing device 12-A includes a local measurement value summary generator 48 that is configured to maintain a summarization of a plurality of measurement values. As discussed at length above, the local measurement value summary generator 48 may comprise any suitable technology capable of maintaining a summary of a plurality of measurement values and providing, upon request, statistical information of a measurement value based on the summary of a plurality of measurement values, which can be used to determine whether a measurement value is an anomalous measurement value. The precise statistical information returned may differ depending on the type of measurement value summary, but in some examples may include, by way of non-limiting examples, a quantile or percentile of the measurement value, a standard deviation, or one or more of a mean, a variance, skewness, a kurtosis, a hyperskewness, or a hypertailedness of the measurement value. Predetermined threshold values may then be accessed to determine whether the measurement value constitutes an anomalous measurement value. In some examples, a measurement value summary may comprise, by way of non-limiting example, a t-digest, or a moment-based quantile sketch.

The computing device 12-A includes a sender 50 that is configured to send the first local measurement value summary to a central computing device. The sender 50 may comprise, for example, a transceiver or data communications device that is configured to send information to another device via a network or other communications medium. The computing device 12-A includes a receiver 52 that is configured to receive a global combined measurement value summary comprising the local measurement value summary and one or more other local measurement value summaries. The receiver 52 may comprise, for example, a transceiver or data communications device that is configured to receive information to another device via a network or other communications medium.

The computing device 12-A includes an anomalous measurement value determiner 54 that is configured to determine whether a measurement value is an anomalous measurement value based at least partially on the global combined measurement value summary. The anomalous measurement value determiner 54 may, for example, invoke a function or method of a measurement value summary technology package, providing the global combined measurement value summary and the new measurement value as parameters, and receive, in return, statistical information, such as, by way of non-limiting example, a quantile estimate identifying a percentile of the new measurement value based on the cumulative distribution of the plurality of measurement values maintained in the global combined measurement value summary. Such information may then be compared to predetermined threshold information to determine whether the measurement value is an anomalous measurement value.

Figure 9:
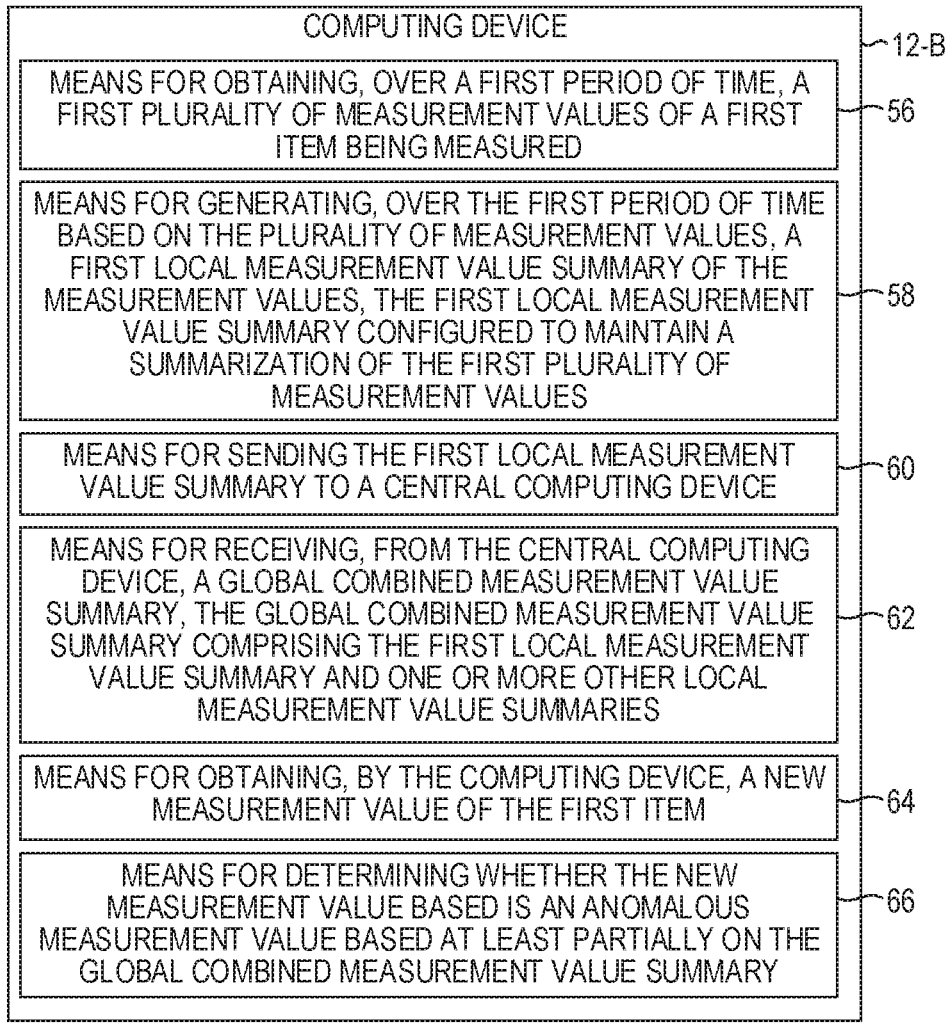
FIG. 9 is a block diagram of a computing device according to additional examples.

FIG. 9 is a block diagram of a computing device 12-B according to additional implementations. The computing device 12-B implements identical functionality as that described above with regard to the computing device 12-1. In this implementation, the computing device 12-B includes a means 56 for obtaining, over a first period of time, a first plurality of measurement values of a first item being measured. The means 56 may be implemented in any number of manners, including, for example, via the measurement value obtainer 46 illustrated in FIG. 8.

The computing device 12-B also includes a means 58 for generating, over the first period of time based on the plurality of measurement values, a first local measurement value summary of the measurement values, the first local measurement value summary configured to maintain a summarization of the first plurality of measurement values. The means 58 may be implemented in any number of manners, including, for example, via the local measurement value summary generator 48 illustrated in FIG. 8.

The computing device 12-B also includes a means 60 for sending the first local measurement value summary to a central computing device. The means 60 may be implemented in any number of manners, including, for example, via the sender 50 illustrated in FIG. 8.

The computing device 12-B also includes a means 62 for receiving, from the central computing device, a global combined measurement value summary, the global combined measurement value summary comprising the first local measurement value summary and one or more other local measurement value summaries. The means 62 may be implemented in any number of manners, including, for example, via the receiver 52 illustrated in FIG. 8.

The computing device 12-B also includes a means 64 for obtaining a new measurement value of the first item. The means 64 may be implemented in any number of manners, including, for example, via the measurement value obtainer 46 illustrated in FIG. 8.

The computing device 12-B also includes a means 66 for determining whether a measurement value is an anomalous measurement value based at least partially on the global combined measurement value summary. The means 66 may be implemented in any number of manners, including, for example, via the anomalous measurement value determiner 54 illustrated in FIG. 8.

Figure 10:
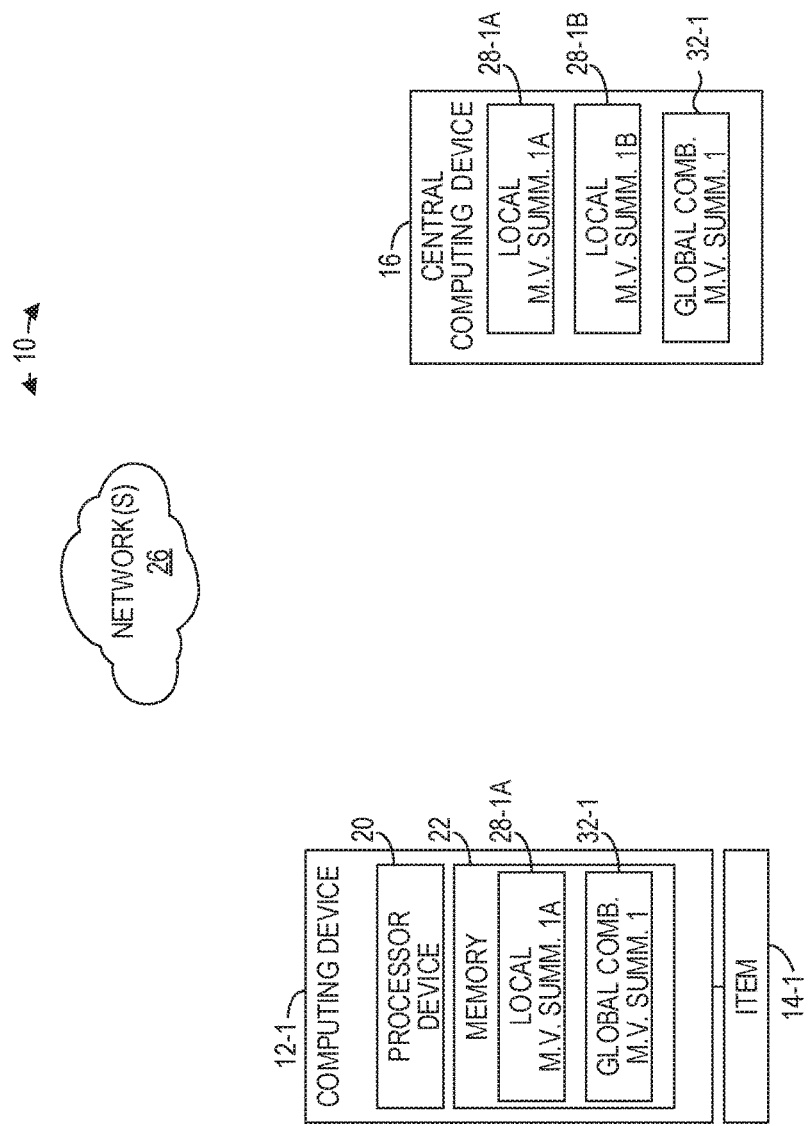
FIG. 10 is a simplified block diagram of the system illustrated in FIG. 1 according to one example.

FIG. 10 is a simplified block diagram of the system 10 according to one implementation. The system 10 includes the computing device 12-1, which in turn includes the memory 22 and the processor device 20 coupled to the memory 22. The processor device 20 is to obtain, over a first period of time, a first plurality of measurement values of the item 14-1 being measured. The processor device 20 is further to generate, over the first period of time based on the first plurality of measurement values, the local measurement value summary 28-1A of the measurement values, the local measurement value summary 28-1A configured to maintain a summarization of the first plurality of measurement values. The processor device 20 is further to send the local measurement value summary 28-1A to the central computing device 16. The processor device 20 is further to receive, from the central computing device 16, the global combined measurement value summary 32-1, the global combined measurement value summary 32-1 comprising the local measurement value summary 28-1A and a local measurement value summary 28-1B generated by a second computing device. The processor device 20 is further to obtain a new measurement value of the item 14-1. The processor device 20 is further to determine whether the new measurement value is an anomalous measurement value based at least partially on the global combined measurement value summary 32-1.

Figure 11:
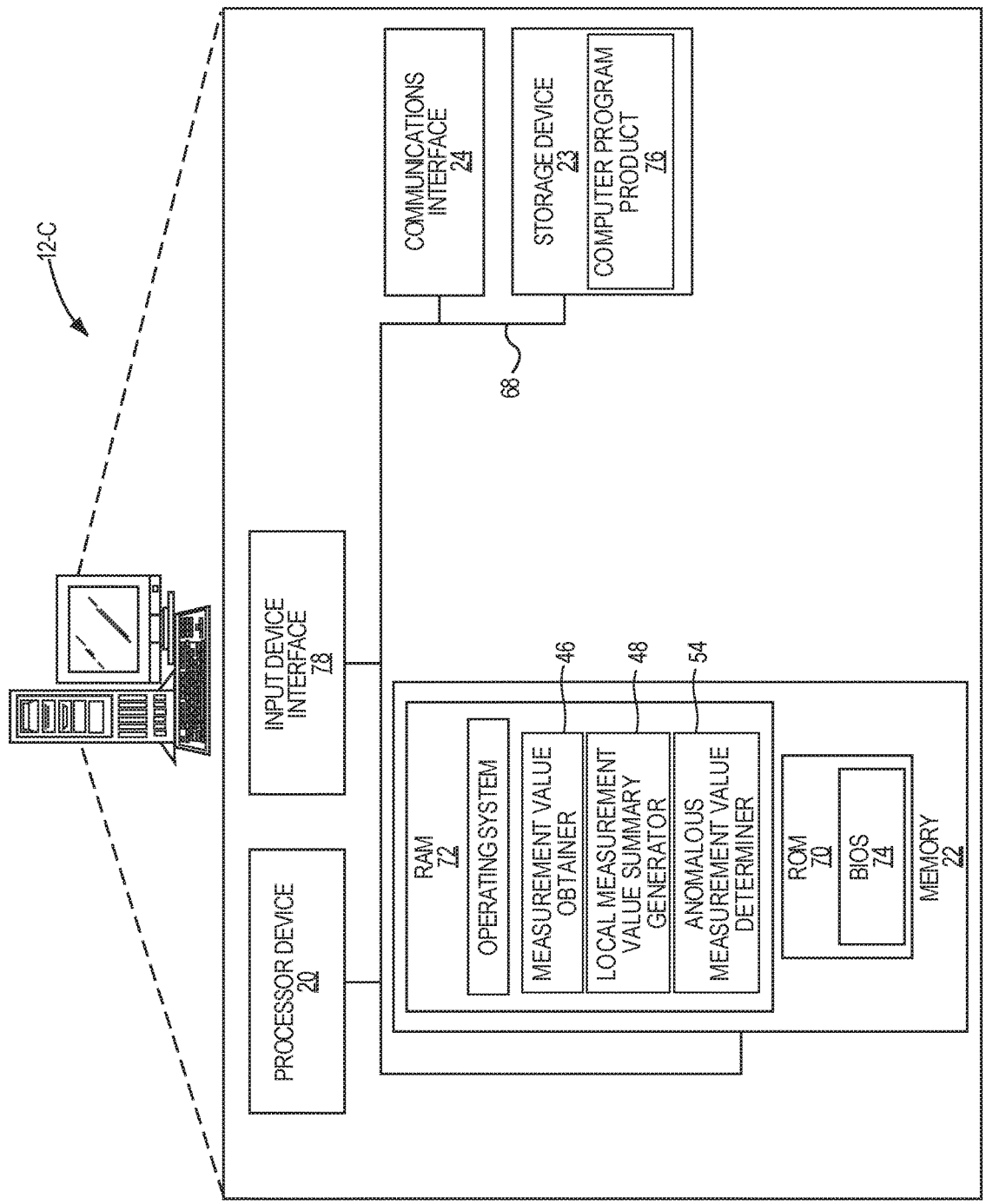
FIG. 11 is a block diagram of a computing device that may be suitable for implementing any of the computing devices disclosed herein.

FIG. 11 is a block diagram of a computing device 12-C that may be suitable for implementing any of the computing devices disclosed herein. The computing device 12-C may comprise any computing or electronic device capable of including firmware, hardware, and/or executing software instructions to implement the functionality described herein, such as a computer server, a desktop computing device, a laptop computing device, a smartphone, a computing tablet, a single-board computing device, or the like. The computing device 12-C includes the processor device 20, the memory 22, and a system bus 68. The system bus 68 provides an interface for system components including, but not limited to, the memory 22 and the processor device 20. The processor device 20 can be any commercially available or proprietary processor.

The system bus 68 may be any of several types of bus structures that may further interconnect to a memory bus (with or without a memory controller), a peripheral bus, and/or a local bus using any of a variety of commercially available bus architectures. The memory 22 may include non-volatile memory 70 (e.g., read-only memory (ROM), erasable programmable read-only memory (EPROM), electrically erasable programmable read-only memory (EEPROM), etc.), and volatile memory 72 (e.g., random-access memory (RAM)). A basic input/output system (BIOS) 74 may be stored in the non-volatile memory 70 and can include the basic routines that help to transfer information between elements within the computing device 12-C. The volatile memory 72 may also include a high-speed RAM, such as static RAM, for caching data.

The computing device 12-C may further include or be coupled to a non-transitory computer-readable storage medium such as the storage device 23, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 23 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 23 and in the volatile memory 72, including an operating system and one or more program modules, such as the measurement value obtainer 46, the local measurement value summary generator 48 and the anomalous measurement value determiner 54, which may implement the functionality described herein in whole or in part.

All or a portion of the examples may be implemented as a computer program product 76 stored on a transitory or non-transitory computer-usable or computer-readable storage medium, such as the storage device 23, which includes complex programming instructions, such as complex computer-readable program code, to cause the processor device 20 to carry out the steps described herein. Thus, the computer-readable program code can comprise software instructions for implementing the functionality of the examples described herein when executed on the processor device 20.

An operator may also be able to enter one or more configuration commands through a keyboard (not illustrated), a pointing device such as a mouse (not illustrated), or a touch-sensitive surface such as a display device. Such input devices may be connected to the processor device 20 through an input device interface 78 that is coupled to the system bus 68 but can be connected by other interfaces such as a parallel port, an Institute of Electrical and Electronic Engineers (IEEE) 1394 serial port, a Universal Serial Bus (USB) port, an IR interface, and the like. The computing device 12-C may also include the communications interface 24 suitable for communicating with a network as appropriate or desired.

Other computer system designs and configurations may also be suitable to implement the systems and methods described herein. The following examples illustrate additional various implementations in accordance with one or more aspects of the disclosure.

Example 1 is a method comprising receiving, by a central computing device, a first plurality of local measurement value summaries from each of a plurality of computing devices, each local measurement value summary maintaining a summarization of a series of measurement values of a corresponding item being measured; combining the first plurality of local measurement value summaries from each of the plurality of computing devices into a single combined measurement value summary; and sending the single combined measurement value summary to the plurality of computing devices for use in identifying measurement values that are not a desired measurement value.

Example 2 is the method of example 1 further comprising analyzing at least one of the local measurement value summaries with respect to the single combined measurement value summary to determine if the at least one of the local measurement value summaries deviates from the single combined measurement value summary a predetermined amount.

Example 3 is the method of example 2 further comprising generating an alert that indicates that the at least one of the local measurement value summaries deviates from the single combined measurement value summary the predetermined amount; and sending the alert to a computing device.

Example 4 is the method of claim 1 wherein the local measurement value summaries and the single combined measurement value summary comprise a t-digest.

Example 5 is the method of claim 1 further comprising prior to receiving the first plurality of local measurement value summaries from each of the plurality of computing devices, sending, to each of the plurality of computing devices, a request to send a most recent local measurement value summary.

Example 6 is the method of claim 1 wherein combining the first plurality of local measurement value summaries from each of the plurality of computing devices into the single combined measurement value summary comprises determining a number of measurement values represented in each of the local measurement value summaries; and using the number of measurement values to weight each local measurement value summary as the first plurality of local measurement value summaries is combined into the single combined measurement value summary.

Example 7 is the method of claim 1 further comprising receiving, by the central computing device, a second plurality of local measurement value summaries from each of the plurality of computing devices; combining the second plurality of local measurement value summaries with the single combined measurement value summary to generate a second single combined measurement value summary; and sending the second single combined measurement value summary to the plurality of computing devices for use in identifying the measurement values that are not the desired measurement value.

Example 8 is an apparatus comprising a memory; and a processor device coupled to the memory. The processor device is to receive a plurality of local measurement value summaries from each of a plurality of computing devices, each local measurement value summary maintaining a summarization of a series of measurement values of a corresponding item being measured, combine the plurality of local measurement value summaries from each of the plurality of computing devices into a single combined measurement value summary, and send the single combined measurement value summary to the plurality of computing devices for use in identifying measurement values that are not a desired measurement value.

Example 9 is an apparatus comprising means for receiving, by a central computing device, a plurality of local measurement value summaries from each of a plurality of computing devices, each local measurement value summary maintaining a cumulative distribution of a series of measurement values of a corresponding item being measured; means for combining the plurality of local measurement value summaries from each of the plurality of computing devices into a single combined measurement value summary; and means for sending the single combined measurement value summary to the plurality of computing devices for use in identifying measurement values that are not a desired measurement value.

Example 10 is an apparatus comprising means for obtaining, over a period of time, a plurality of measurement values of a item being measured; means for generating, over the first period of time based on the plurality of measurement values, a local measurement value summary of the measurement values, the local measurement value summary configured to maintain a summarization of the plurality of measurement values; means for sending the local measurement value summary to a central computing device; means for receiving, from the central computing device, a global combined measurement value summary, the global combined measurement value summary comprising the local measurement value summary and one or more other local measurement value summaries; means for obtaining, by a computing device, a new measurement value of the item; and means for determining whether the new measurement value is an anomalous measurement value based at least partially on the global combined measurement value summary.

Example 11 is an apparatus comprising a local measurement value summary generator that is configured to maintain a summarization of a plurality of measurement values; a sender that is configured to send a local measurement value summary to a central computing device; a receiver that is configured to receive a global combined measurement value summary comprising the local measurement value summary and one or more other local measurement value summaries; and an anomalous measurement value determiner that is configured to determine whether a new measurement value is an anomalous measurement value.

Example 12 is a system comprising a plurality of computing devices, each computing device configured to generate a local measurement value summary configured to maintain a summarization of measurement values of an item; send the local measurement value summary to a central computing device; receive, from the central computing device, a global combined measurement value summary generated based on each of the local measurement value summaries; and use the global combined measurement value summary to determine a percentile estimate of a new measurement value.

Example 13 is the system of example 12 wherein at least one computing device of the plurality of computing devices is configured to determine, based on the global combined measurement value summary, that the new measurement value is an anomalous measurement value; and in response, send an alert to an operations computing device.

Example 14 is a computing device comprising a memory and a processor device coupled to the memory. The processor device is to obtain a global combined measurement value summary, the global combined measurement value summary comprising a combined measurement value summary of a plurality of measurement values taken by a plurality of other computing devices measuring a first type of item; obtain a measurement value of an item of the first type; determine whether the measurement value is an anomalous measurement value based at least partially on the global combined measurement value summary; and in response to determining that the measurement value is an anomalous measurement value, communicate an alert.

Example 15 is the computing device of Example 14 wherein to determine that the measurement value is an anomalous measurement value, the processor device is further to access a predetermined percentile threshold, and based on the predetermined percentile threshold, determine that the measurement value is an anomalous measurement value.

Example 16 is the computing device of Example 14 wherein the computing device comprises a single-board computing device.

Example 17 is the computing device of Example 16 wherein the single-board computing device comprises one of a Raspberry Pi, a Rock64, and a BeagleBoard Example 18 is the computing device of Example 14, wherein the processor device is further to access a plurality of local measurement value summaries, each local measurement value summary maintaining a summarization of the plurality of measurement values taken over a corresponding period of time; obtain a new measurement value; access the plurality of local measurement value summaries and a plurality of successive measurement values and determine, based on the plurality of local measurement value summaries and the plurality of successive measurement values, that the new measurement value represents a deviation trend of the plurality of measurement values that exceeds a predetermined deviation trend.

Individuals will recognize improvements and modifications to the preferred examples of the disclosure. All such improvements and modifications are considered within the scope of the concepts disclosed herein and the claims that follow.

The invention claimed is:

1. A method comprising:
   obtaining, by a computing device over a first period of time, a first plurality of measurement values from a sensor that quantifies a concentration of a chemical in a first fluid;
   adding, over the first period of time by the computing device, each of the measurement values to a first local t-digest, the first local t-digest having a maximum physical size irrespective of a quantity of the first plurality of measurement values added to the first local t-digest and being configured to maintain a summarization of the first plurality of measurement values, the first local t-digest being operable to, when queried with a measurement value, return a quantile or percentile of the measurement value with respect to each measurement value previously added to the first local t-digest;
   sending the first local t-digest to a central computing device;
   receiving, by the computing device from the central computing device, a global combined t-digest, the global combined t-digest comprising a combination of the first local t-digest and one or more other local t-digests generated by other computing devices, the global combined t-digest being operable to, when queried with a measurement value, return a quantile or percentile of the measurement value with respect to each measurement value previously added to the first local t-digest and the t-digests of the other computing devices;

obtaining, by the computing device, a new measurement value of the concentration of the chemical in the first fluid;

generating, by the computing device, a second local t-digest using the new measurement value;

combining, by the computing device, the global combined t-digest and the second local t-digest to generate a new combined t-digest;

determining, by the computing device, whether the new measurement value is an anomalous measurement value based at least partially on the new combined t-digest, wherein determining whether the new measurement value is an anomalous measurement value comprises querying the new combined t-digest based on the new measurement value; and when the new measurement value is greater than a threshold that indicates the new measurement value is an anomalous measurement value, sending, by the computing device, an alert to a destination.

2. The method of claim 1 further comprising:

obtaining, by the computing device over a second period of time, a second plurality of measurement values that quantifies the concentration of the chemical in the first fluid;

adding, by the computing device based on the second plurality of measurement values, each of the measurement values of the second plurality of measurement values to the second local t-digest of the measurement values, the second local t-digest configured to maintain a summarization of the second plurality of measurement values;

obtaining, by the computing device, a new first measurement value of the first fluid;

combining, by the computing device, the global combined t-digest and the second local t-digest to generate a new first combined t-digest; and determining whether the new first measurement value is an anomalous measurement value based on the new first combined t-digest.

3. The method of claim 2 further comprising:

for each measurement value of the second plurality of measurement values:
  modifying the global combined t-digest based on the measurement value; and
  modifying the second local t-digest based on the measurement value.

4. The method of claim 2 further comprising:

for each measurement value of the second plurality of measurement values:
  combining the global combined t-digest with the second local t-digest to generate the new first combined t-digest; and
  determining whether the new first measurement value is an anomalous measurement value based on the new first combined t-digest.

5. The method of claim 1 wherein the first local t-digest remains a fixed size over the first period of time irrespective of a number of measurements.

6. The method of claim 1 further comprising:

receiving, by the computing device from the central computing device, a request to provide the first local t-digest to the central computing device; and in response to the request, sending the first local t-digest to the central computing device.

7. The method of claim 1 further comprising:

determining, by the computing device at a point in time subsequent to determining whether the new measurement value is an anomalous measurement value, that the computing device has recently initiated;

sending, by the computing device to the central computing device, a request for a current global combined t-digest;

receiving, by the computing device from the central computing device, the current global combined t-digest;

obtaining, by the computing device, a measurement value of the first fluid; and determining whether the measurement value is an anomalous measurement value based at least partially on the current global combined t-digest.

8. The method of claim 1 wherein the first plurality of measurement values is obtained periodically over the first period of time.

9. The method of claim 1 wherein the fluid comprises a body of water.

10. A system comprising:

a first computing device comprising:
  a first memory; and
  a first processor device coupled to the first memory to:
    obtain, from a sensor over a first period of time, a first plurality of measurement values that quantifies a concentration of a chemical in a first fluid;
    add, over the first period of time, each of the measurement values to a first local t-digest, the first local t-digest having a maximum physical size irrespective of a quantity of the first plurality of measurement values added to the first local t-digest and being configured to maintain a summarization of the first plurality of measurement values, the first local t-digest being operable to, when queried with a measurement value, return a quantile or percentile of the measurement value with respect to each measurement value previously added to the first local t-digest;
    send the first local t-digest to a central computing device;
    receive, from the central computing device, a global combined t-digest, the global combined t-digest comprising a combination of the first local t-digest and a local t-digest generated by a second computing device, the global combined t-digest being operable to, when queried with a measurement value, return a quantile or percentile of the measurement value with respect to each measurement value previously added to the first local t-digest and the t-digests of the second computing device;
    obtain a new measurement value of the concentration of the chemical in the first fluid;
    generate a second local t-digest using the new measurement value;
    combine the global combined t-digest and the second local t-digest to generate a new combined t-digest;
    determine whether the new measurement value is an anomalous measurement value based at least partially on the new combined t-digest, wherein determining whether the new measurement value is an anomalous measurement value comprises querying the new combined t-digest based on the new measurement value; and when the new measurement value is greater than a threshold that indicates the new measurement value is an anomalous measurement value, sending an alert to a destination.

11. The system of claim 10 wherein the first processor device is further to:

obtain a second plurality of measurement values that quantifies the concentration of the chemical in the first fluid;

add, based on the second plurality of measurement values, each of the measurement values of the second plurality of measurement values to the second local t-digest of the measurement values, the second local t-digest configured to maintain a summarization of the second plurality of measurement values;

obtain a new first measurement value of the first fluid;

combine the global combined t-digest and the second local t-digest to generate a new first combined t-digest; and determine whether the new item first measurement value is an anomalous measurement value based on the new first combined t-digest.

12. The system of claim 10 wherein the first processor device is further to determine, based on a timer, that the first local t-digest is to be sent to the central computing device.

13. The system of claim 10, further comprising:

a second computing device comprising:

a second memory; and a second processor device coupled to the second memory to:

obtain, over the first period of time, a first plurality of second measurement values of the first fluid;

add, over the first period of time, the first plurality of second measurement values to the second local t-digest, the second local t-digest configured to maintain a summarization of the first plurality of second measurement values;

send the second local t-digest to the central computing device;

receive, from the central computing device, the global combined t-digest, the global combined t-digest comprising the first local t-digest and the second local t-digest;

obtain a new second measurement value of the first fluid; and determine whether the new second measurement value is an anomalous measurement value based at least partially on the global combined t-digest.

14. The system of claim 13 further comprising:

the central computing device comprising:

a third memory; and a third processor device coupled to the third memory to:

receive the first local t-digest and the second local t-digest;

combine the first local t-digest and the second local t-digest into the global combined t-digest; and send the global combined t-digest to the first computing device and to the second computing device for use in determining measurement values that are not desired measurement values.

\* \* \* \* \*